(12) United States Patent
Swenson et al.

(10) Patent No.: US 7,434,078 B2
(45) Date of Patent: Oct. 7, 2008

(54) SYNCHRONIZATION WITH HARDWARE UTILIZING SOFTWARE CLOCK SLAVING VIA A CLOCK

(75) Inventors: Steven E. Swenson, Redmond, WA (US); Jeffrey S. Hoekman, Kirkland, WA (US); Theodore C. Tanner, Jr., Hollywood, SC (US); Joseph C. Ballantyne, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1462 days.

(21) Appl. No.: 10/394,966

(22) Filed: Mar. 21, 2003

(65) Prior Publication Data

US 2004/0187043 A1  Sep. 23, 2004

(51) Int. Cl.
G06F 1/04 (2006.01)
G06F 1/12 (2006.01)
G06F 13/42 (2006.01)
H04L 5/00 (2006.01)

(52) U.S. Cl. .............. 713/400; 713/401; 713/500; 713/501; 713/502; 713/503

(58) Field of Classification Search .......... 713/400
See application file for complete search history.

(56) References Cited

U.S. PATENT DOCUMENTS 5,430,835 A * 7/1995 Williams et al. ........... 715/203
5,768,607 A * 6/1998 Drews et al. ............... 715/203
5,850,338 A * 12/1998 Fujishima ..................... 700/3
6,874,102 B2 * 3/2005 Doody et al. ................ 714/12
2003/0217181 A1 * 11/2003 Kiiskinen .................. 709/248
2004/0015893 A1 * 1/2004 Banavar et al. ............ 717/138
2004/0201621 A1 * 10/2004 Stevens ..................... 345/751

* cited by examiner

Primary Examiner—Rehana Perveen
Assistant Examiner—Michael J Brown
(74) Attorney, Agent, or Firm—Lee & Hayes, PLLC

(57) ABSTRACT

A sample rate converter (SRC) is used to slave hardware devices to a master hardware device. A clock manager registers the time at each clock of each device, communicates with memory that stores the clock times, and reports correlations between each clock time and the time at a reference clock. The processing of a data stream can be slaved to one or more hardware devices. The processing of a wake up period can be slaved to the clock of the master hardware device by adjusting the wakeup period. Slaving of hardware devices to the master hardware device can also be accomplished by finding a correlation between the clock times in memory and the reference clock. Each correlation can be input into an SRC corresponding to each slave hardware device. Each SRC can then generate or consume a data stream at the actual rate of the corresponding slave hardware device.

44 Claims, 9 Drawing Sheets

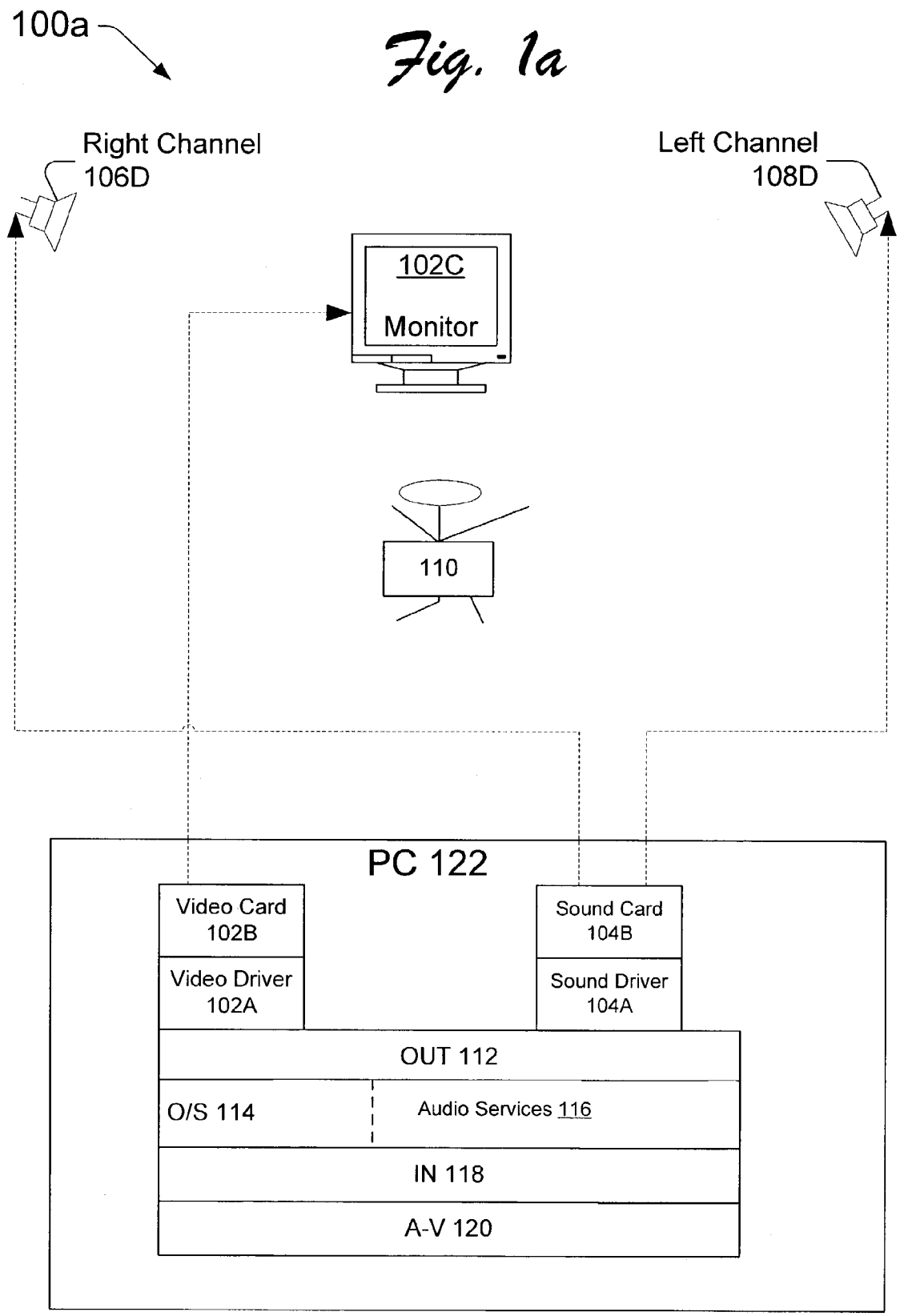

US 7,434,078 B2

SYNCHRONIZATION WITH HARDWARE UTILIZING SOFTWARE CLOCK SLAVING VIA A CLOCK

TECHNICAL FIELD

This invention generally relates to processing data in computer hardware devices and, more particularly, to synchronizing the processing of data among different computer hardware devices using components of an operating system.

BACKGROUND

In an environment 100a of FIG. 1a, a personal computer (PC) 122 is being operated by a person 110 who is watching a video display on a monitor 102C. By way of example, person 110 can be watching a motion picture (movie) on monitor 102C, where the movie has a six (6) channel sound track in a Dolby® 5.1 format, and where PC 122 has Digital Video Disc (DVD) playback device in an A-V section 120 to playback the movie. PC 122 is executing an audio visual application to playback the movie on a DVD. By way of example, the audio visual application can be the Windows® Media Player software as provided by the Microsoft Corporation, of Redmond, Wash., USA.

An operating system (O/S) 114 of PC 122 recognizes the A-V section 120 that passes audio and video data to an input (IN) section 118. IN section 118 passes the audio and video data to a video system service of an operating system 114. The video system service of operating system 114 passes video data to a video driver 102A that drives a video card 102B. Video card 102B in turn outputs video signals of the movie to monitor 102C.

O/S 114 also recognizes a stereo sound card 104B. The stereo sound card 104B can be an expansion board mounted on a mother board that enables PC 122 to render stereo sound to the right and left speakers 106D, 108D by translating digital data into analog sounds. Stereo sound card 104B can be used to render (playback) or capture (record) audio data. For instance, stereo sound card 104B can be used to record sound input from a microphone connected to the PC 122, such as a microphone 535 seen in FIG. 5, and can be used to manipulate sound stored on a disk. The stereo sound card 104B can produce only two (2) channels of sound, rather than the six (6) channels of sound of the sound track of the movie on the DVD.

Person 110 sees the movie and hears the stereo sound through operation of the O/S 114 that includes an audio services component 116. The audio services component 116 includes an audio source, an audio buffer, and various software components. The O/S 114 of PC 122 uses a system timer (not shown) to periodically wake up the audio services component 116 for a period of time called a wake up period. During the wake up period, the audio services component 116 generates audio data that flows from the audio source within the audio services component 116. The audio data in the audio source can be moved to the audio buffer that is also within the audio services component 116. Sound card 104B is driven by a sound driver 104A to receive audio data from the audio buffer or to output audio data to the audio buffer.

When an audio device, such as sound card 104B, is used to render sound, each time the audio services component 116 wake ups, a query is made as to whether there is enough audio data in the audio buffer for the audio device. If there is enough audio data in the audio buffer for the audio device, a delay in the production of sound will be avoided before the start of the next wake up period. If there is too little data in the audio buffer for the audio device, then the audio services component 116 generates more data and puts that data down into the audio buffer for the audio device. In this situation, there will be an excess delay (e.g., latency) in the production of sound. For example, the audio services component 116 may be configured to generate a certain quantity of audio data during a wake up period having a duration of 10 milliseconds (ms). The audio services component 116 may also be configured to keep three times this quantity in the audio buffer for the audio device. As such, the audio services component 116 will maintain the quantity of audio data in the audio buffer to be that quantity that can be generated during three wake up periods of 10 milliseconds (e.g., 3-10 ms 'buffers'). When the audio services component 116 wakes up, a query is made to see how many 10 ms buffers are stored in the audio buffer for the audio device. Fewer 10 ms buffers in the audio buffer means that the audio device has consumed more audio data than a norm. If the query finds that 2-10 ms buffers have been consumed by the audio device from the audio buffer, then the audio services component 116 generates 2 more 10 ms buffers of data and then sends that audio data down to the audio buffer for the audio device so that there will be 3-10 ms buffers in the audio buffer. If the audio services component 116 wakes up, the audio buffer quantity query is conducted, and the query finds that only 1-10 ms buffer has been consumed by the audio device, and then the audio services component 116 generates 2-10 ms buffers and sends them to the audio buffer. If the audio services component 116 wakes up and finds no audio data in the audio buffer (e.g., all 3-10 ms buffers were consumed by the audio device from the audio buffer), there would be excessive latency in the audio data being rendered by the audio device. Alternatively, a different problem can be realized when there is an excess of audio data in the audio buffer. This excess causes an 'audio latency glitch' that is characterized by a timing delay between when sound is suppose to be rendered and when the sound it is actually rendered.

The audio services component 116 can also cooperate with the audio device so that the audio device can be used to capture (record) audio data and store the audio data in the audio buffer. For example, an audio device such as sound card 104B can be used to capture sound where the sound card 104B receives audio data from a microphone. The microphone can be used by an operator of the PC in a real time communication application (RTC) for PC telephony. During the execution of the RTC, an operator speaks into the microphone and the operator's voice is captured using the capturing audio device (e.g., one or more sound cards), typically at a rate of 8 kHz (8000 samples/second). In this scenario, the audio services component 116 may be configured to wake up 100 times per second. So, during each wake up period, the audio services component 116 is processing 80 samples each time that the audio services component 116 wakes up. Stated otherwise, 80 samples are processed by the audio services component 116 during each 10 ms wake up period. An audio latency glitch can occur when the clock of the audio device is running faster than a clock of a system timer that runs the scheduling of the wake up period of the audio services component 116. As such, the faster audio device is actually generating more than 80 samples every 10 ms wake up period. Over time, the generated samples will accumulate until the audio buffer will not have read enough samples from the audio device. As such, the audio device will overwrite its own audio buffer and there will be an 'audio overwriting glitch'. Stated otherwise, an audio overwriting glitch occurs where the audio device is generating audio data too fast to be put into the audio buffer for the audio device such that samples will be lost. When the audio data is rendered, the audio overwriting glitch will result in a popping or clicking sound. Each audio overwriting glitch causes the recorded or captured sound to differ from the actual sound that was intended to be recorded.

Another type of audio glitch occurs when the clock of the capturing audio device is running slower than the clock of the system timer that runs the scheduling of the wake up period of the audio services component 116. Here, dropped audio samples can occur because the capturing audio device is generating audio data too slowly. When the captured audio data is rendered, a clicking sound will be heard.

Still another audio glitch can occur when the audio services component 116 is reading audio data from its audio buffer for the capturing audio device too fast such that there is not enough audio data in the audio buffer. Here, the rendering of the captured audio data will result in gaps of silence, a broken up sound, or silence occurring in between samples of sound.

In sum, the types of problems in the production of sound that arise depend upon whether the audio device is running faster or slower than the clock of the system timer that is being used to run the software processing of the audio services component 116. A typical and noticeable problem is an excessive delay between when sound is supposed to be rendered and when the sound it is actually rendered. Accordingly, it would be an advantage in the art to provide implementations for rendering and capturing audio data with an audio device while avoiding the foregoing problems associated with the production of sound.

Sound and video, such as music and audio visual productions, are increasing being marketed in formats that are more sophisticated that two channel stereo. For example, six channel sound productions accommodate sound fields that have a right front channel, a left front channel, a right rear channel, a left rear channel, a center channel, and a bass channel. One example of a six channel sound production is a movie that has a sound track with audio data in a Dolby® 5.1 format, where the movie is embodied on portable media having a magneto optics format (e.g., DVD).

Computing systems, such as PC 122, are increasingly being used for recording and playing back streaming audio. A PC typically has an integrated sound card that is mounted on the mother board of the PC. The integrated sound card can typically process only two channels (e.g., stereo) of sound. In order to process a six channel sound production with a PC, expensive hardware is required. It would be an advantage in the art to provide an operating system for a PC that would enable the PC to play back a sound production having more than two channels without requiring expensive audio hardware.

PCs typically are arranged to communicate with one or more hardware devices through a bus that receives one or more printed circuit boards respectively associated with the hardware devices. The bus interfaces the plurality of printed circuit boards with the mother board of the PC. Examples of printed circuit boards are sound cards, video cards, a firewall card, a network card, etc. In such an arrangement of the PC, synchronization of one hardware device with one or more other hardware devices may be desirable. It would be an advantage in the art to provide an operating system for a PC that would synchronize hardware devices one with another without requiring expense hardware.

SUMMARY

Each unrelated hardware clock of one or more slave hardware devices is slaved using a variable rate sample rate converter to keep the slave hardware device synchronized with a master hardware device that also has a hardware clock. A clock manager is used to register and unregister each clock as hardware devices are added and removed. The clock manager communicates with a memory-mapped hardware register that stores the time for each registered clock. The clock manager can report a correlation of the time at each registered clock with respect to the time at a reference clock. The reference clock can be the system time. Several implementations can be used to slave the processing of a data stream to one or more hardware devices. One implementation slaves the processing of a wake up period to the hardware clock of the master hardware device by adjusting the wakeup period. Another implementation determines the time difference between the hardware clocks and the reference clock to find a correlation between the various hardware clocks. The respective correlation is then input into a variable rate sample rate converter corresponding to each slave hardware device. Each variable rate sample rate converter can then generate or consume data stream samples at the actual rate of the corresponding slave hardware device.

BRIEF DESCRIPTION OF THE DRAWINGS

The detailed description is described with reference to the accompanying figures in which the same numbers are used throughout the disclosure and figures to reference like components and features. Series 100 numbers refer to features originally found in FIGS. 1*a*-1*b*, series 200 numbers refer to features originally found in FIGS. 2*a*-2*c*, and series 300 numbers refer to features originally found in FIG. 3*a*-3*b*, and so on.

FIG. 1*a* shows an environment in which a person hears sound and see video images produced by a computing system receiving an audio visual data source as an input, where an operating system of the computing system interfaces with video and sound cards and their respective drivers.

DETAILED DESCRIPTION

Figure 1B:
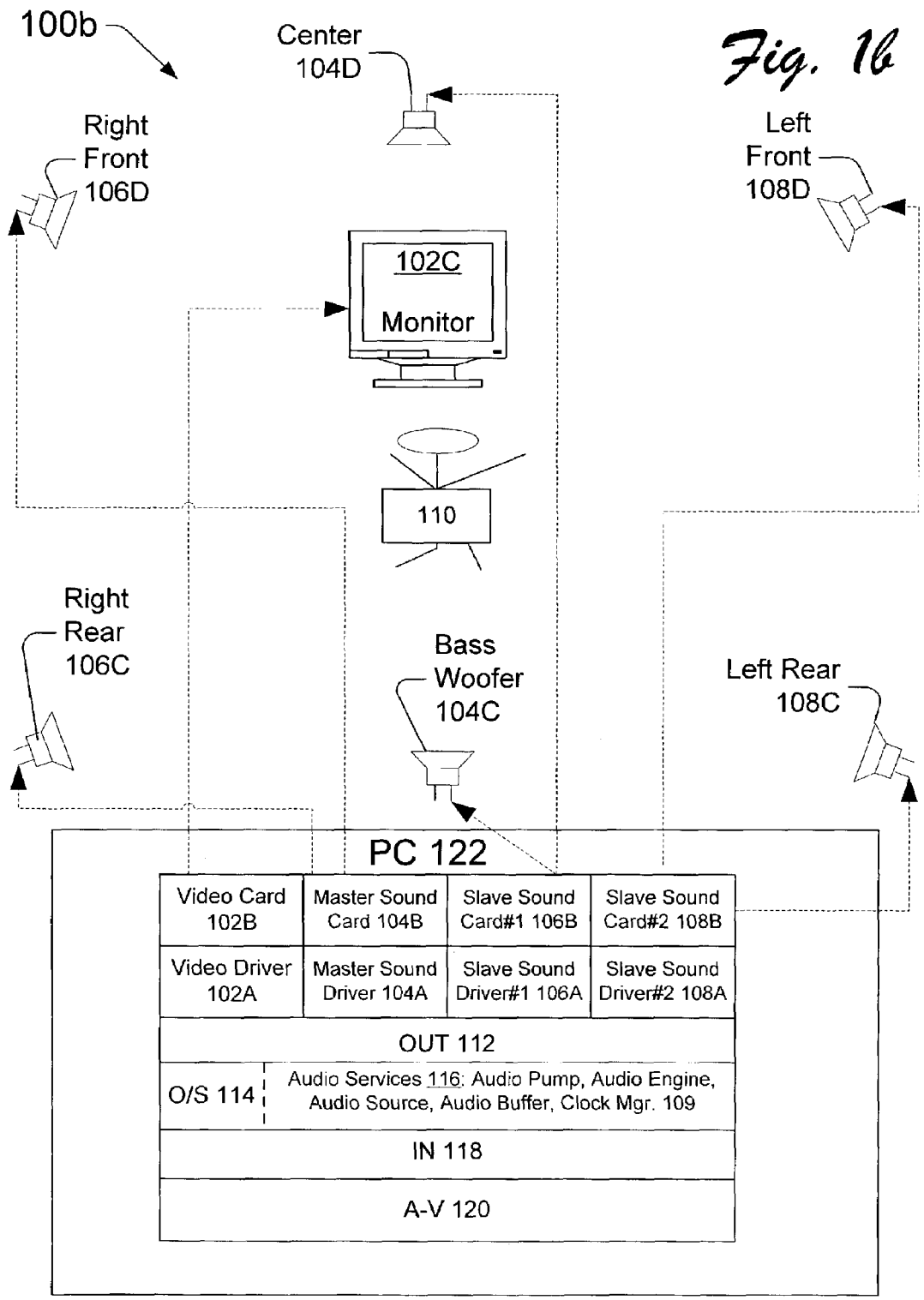
FIG. 1*b* shows an environment in which a person hears sound in six channels produced by a computing system receiving a six channel audio data source input, where an operating system of the computing system interfaces with a master sound card and with first and second slave sound cards to produce two channels of the six channel sound with each sound card, and where the sound from the channels of the slave sound cards is synchronized with the sound from the channels of the master sound card.

An implementation of the present invention makes it possible to form a composite audio device from a logical grouping of two or more physical devices. The composite audio device is thus a single virtual audio device. From the perspective of an audio application, the composite device is logically the same as any other single physical device, although the single virtual audio device has the capabilities of more than any one physical device. FIG. 1b shows an example of a single virtual audio device that is used to produce six (6) channels of sound heard by a person 110 that accompanies a video display on a monitor 102C that is being watched by person 110. By way of example, person 110 can be watching a movie on monitor 102C, where the movie has a sound track in a Dolby® 5.1 format, and where a personal computer (PC) 122 has Digital Video Disc (DVD) playback device in an A-V section 120 to playback the movie decode the sound track in the Dolby® 5.1 format.

In an environment 100b of FIG. 1b, person 110 hears sound in six channels produced by PC 122 that is executing an audio visual application to playback a movie on removable media having a six channel sound track. By way of example, the audio visual application can be the Windows® Media Player software as provided by the Microsoft Corporation, of Redmond, Wash., USA. An operating system 114 of PC 122 recognizes a logical composite audio device that is made up of a master sound card and with first and second slave sound cards. These master and slave sound cards each produce two channels of the six channel sound, where the sound of the channels of the slave sound cards is synchronized with the sound of the channels of the master sound card. Person 110 sees the movie and hears the sound by A-V section 120 passing audio and video data to an input (IN) section 118. IN section 118 passes the audio and video data to a video system service of an operating system 114. The video system service of operating system 114 passes video data to a video driver 102A that drives a video card 102B. Video card 102B in turn outputs the video signals of the movie to monitor 102C.

A single virtual audio device depicted in FIG. 1b is made up of a logical grouping of three (3) stereo sound cards 104B, 106B, and 108B. Each stereo sound card is an expansion board mounted on the mother board that enables PC 122 to manipulate and output stereo sounds by translating digital data into analog sounds. Stereo sound cards 104B, 106B, and 108B enable PC 122 to output sound through a respective pair of speakers that are connected to the board, to record sound input from a microphone connected to the computer, and to manipulate sound stored on a disk. As shown in FIG. 1b, a master sound card 104B is driven by a master sound driver 104A and outputs analog sound in a first channel for rendering through a right rear speaker 106C and in a second channel for rendering through a right front speaker 106D. A slave sound card #1 106B is driven by a slave sound driver #1 106A and outputs analog sound in a first channel for rendering through a center speaker 104D and in a second channel for rendering through a bass woofer speaker 104C. A slave sound card #2 108B is driven by a slave sound driver #2 108A and outputs analog sound in a first channel for rendering through a left rear speaker 108C and in a second channel for rendering through a left front speaker 108D.

In order for person 110 to have a consumer-quality listening experience with the six channels of sound, it is desirable that operating system 114 keep the software processing done on the audio data stream synchronized with the rate at which the three (3) stereo sound cards 104B, 106B, and 108B are consuming or producing the audio data stream. Failure to synchronize the consumption and production rates of each stereo sound card will cause 'pops' or 'clicks' to be heard by person 110—which are representative of temporary disruptions in the audio data stream. Temporary disruptions are prevented by different implementations disclosed herein.

One implementation prevents temporary disruptions in the audio data stream by slaving the unrelated clocks of the two slave sound cards 106B, 108B to the clock of the master sound card 104B using a variable rate Sample Rate Converter (SRC) so as to keep the slave sound cards 106B, 108B in synchronization with the master sound card 104B. Each variable rate SRC can be used to assist in matching devices that generate and consume audio data at different rates. To do so, the variable rate SRCs are used to change the sampling rate of audio data streams by making conversions that account for the drift in various hardware devices (e.g., sound cards). For instance, an SRC can be used in device synchronization to convert a sampling rate from 48,000 Hz to 48000.0001 Hz.

A Clock Manager 109 in an audio services section 116 of operating system 114 is used to export a clock by making a call to get an estimate of a sample rate. In one implementation, this call for a rate estimate is a memory-mapped hardware register that ticks off the hardware time. Other techniques that do not use a memory-mapped hardware register are also contemplated. The Clock Manager 109 is responsible for reporting to one or more audio applications running on PC 122 the correlation between a reference clock and the one or more hardware clocks of the audio devices being synchronized. The reference clock can be the clock of the system timer or any clock associated with the system that is assessable to the Clock Manager 109. The processing on the two slave sound cards 106B, 108B are slaved to the master sound card 104B by a correlation between the hardware clocks thereof and the reference clock to correlate the hardware clocks. This correlation is then input into a variable rate SRC so that the data processing rate of the master sound card 104B will match the actual rate that the two slave sound cards 106B, 108B are generating or consuming samples. In essence, this implementation locks global audio engine software processing to multiple physical devices (e.g., sound cards) in order to make them appear as a single device.

Another implementation prevents temporary disruptions in the audio data stream by slaving the "wakeup" tick of a reference clock to the hardware clock of a master device. The slaving of the processing "wakeup" tick is accomplished by adjusting the wakeup period of an audio pump. This implementation works only with the master device which, with respect to FIG. 1b, does not involve the slaving of slave sound cards 106B, 108B to master sound card 104B.

The single virtual audio device depicted in FIG. 1b could be made up of other computer hardware devices than the stereo sound cards 104B, 106B, and 108B. For instance, each device 104B and 106B could be a stereo sound card and device 108B could be a card having one of more Universal Serial Bus (USB) ports to connect to one of more USB speaker sets. Alternatively, devices 104B and 106B could each be a card having one or more USB ports to connect to a pair of USB speaker sets and device 108B could be a stereo sound card. The use of other types of audio devices that USB speaker sets is also contemplated, such as a network audio device that is commonly referred to as a TCP/IP speaker. Other arrangements are contemplated to accomplish a logical grouping of the three (3) computer hardware devices 104B, 106B, and 108B so as to accommodate an audio device capable of producing six channels of sound.

Figure 2A:
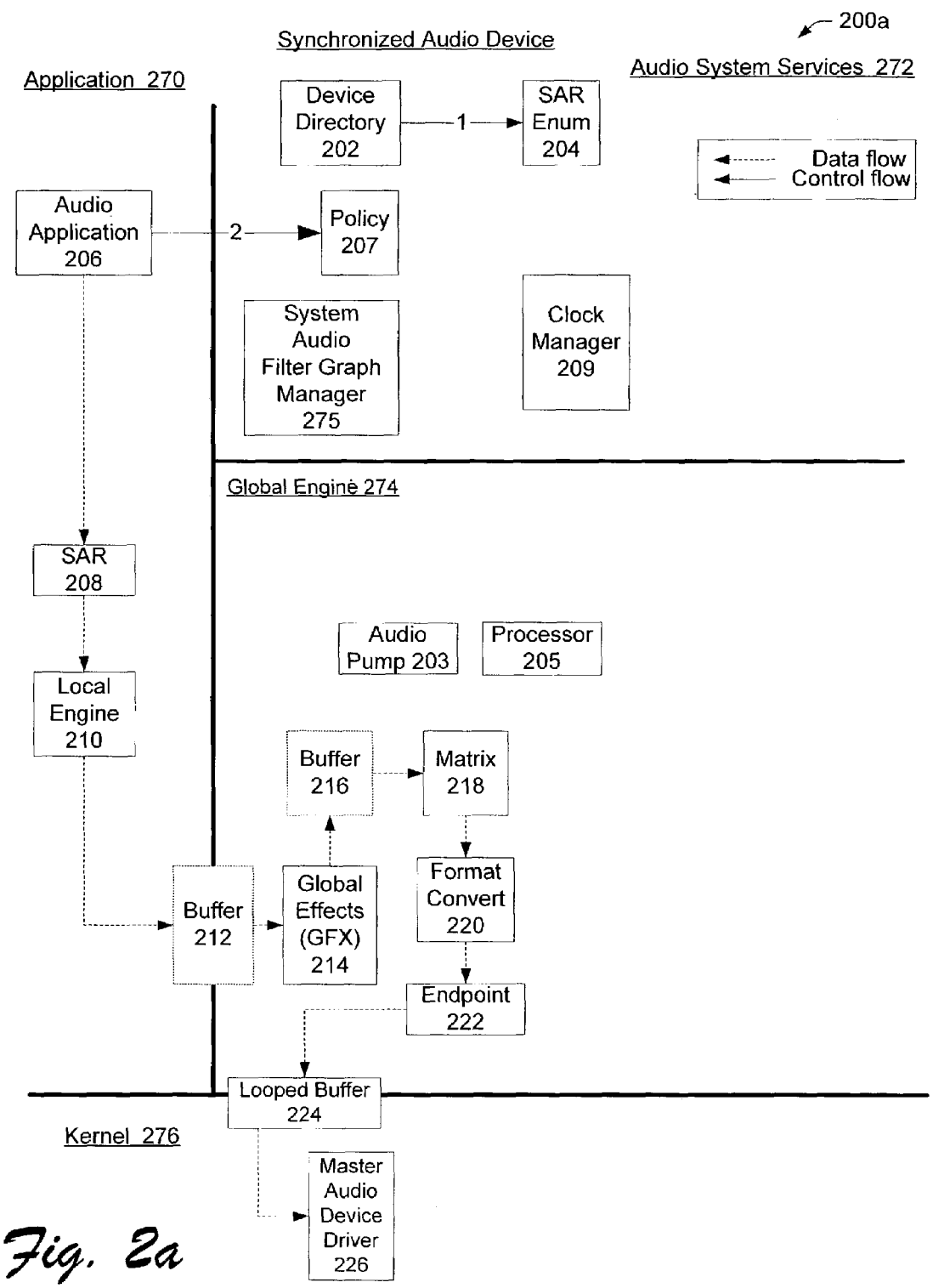
FIG. 2*a* shows an implementation in which an audio application is executing in a computer system having an operating system, where sound from the audio application is output using a device driver, and where the sound rendered by use of the device driver is synchronized with a reference clock.

Another implementation is seen in FIG. 2a. Rather than slaving audio devices to a master audio device, FIG. 2a features an environment 200a where sound is rendered by an audio device having a clock. The sound rendered by the audio device can be synchronized with a reference clock that is independent of the clock of the audio device. The reference clock can be the clock of a system timer. Environment 200a depicts how a clock (not shown) of an audio device (not shown) driven by a master audio driver 226 can correlate with a clock (not shown) of the system timer.

Environment 200a has four (4) sections that are delimited by the darker lines and include an application section 270, an audio system services section 272, a global engine section 274, and a kernel section 276. Application section 270 is serviced by audio system services section 272. The audio system services section 272 has a device directory 202 and a system audio filter graph manager 275. The global engine section 274 receives input from application section 270 and outputs to output devices (not shown) via a Master Audio Device Driver 226. Included in the global engine section 274 is a processor 205. Processor 205 is intended to represent a name of an object that maintains a list of audio effects that are to be processed, where the object calls for these effects to be processed.

In FIG. 2a, the environment 200a has solid arrows that reflect the flow of control and dashed arrows indicate data flow. A Control Flow indicated with reference numeral '1' begins when device directory 202 passes a Control Flow instruction to streaming audio renderer (SAR) enumerator 204 to begin a process that is illustrated in environment 200a. SAR enumerator 204 inserts an audio device descriptor into device directory 202 that will represent an audio device that is driven by master audio device driver 226. The Control Flow arrow at reference numeral '2' indicates that audio application 270 invokes a policy 207. Policy 207 is responsible for being able to describe and set up a desired graph in response to opening the audio device that is driven by master audio device driver 226. Otherwise, most of the structure is set up in environment 200a by a system audio filter graph manager 275.

A clock (not shown) that is integral to the audio device (not shown) that is driven by Master Audio Device Driver 226 can be registered with a Clock Manager 209 prior to any of the Control Flows 1-2. The Clock Manager 209 can correlate the system time to the clock of the master audio device driven by driver 226. In one implementation, a memory mapped register can be used to store at a location in a memory for the time of the clock of the audio device (e.g., hardware device) that is driven by master audio device driver 226. The memory location is assessable to the Clock Manager 209. The Clock Manager 209 accesses the memory address corresponding to the clock to read the time corresponding to the clock. By polling the ticking of the clock that is mapped into a memory location, the Clock Manager 209 can provide correlations between a clock of a system timer and the clock of the audio device. In essence, each such access is deemed by the relevant software as a register read.

Audio data flows from audio application 206 to Streaming Audio Renderer (SAR) 208. SAR 208 renders audio data to local engine 210 which in turn outputs audio data to buffer 212 for entry into the global engine section 274. In the global engine section 274, audio data flows to a global effects module (GFX) 214. Any of various signal processing can be performed by GFX 214 to accomplish a global effect on a mix of audio data streams that have been received in the global engine section 274. GFX 214 outputs the audio data it has processed to a buffer 216 from which the audio data flows to a matrix 218. Matrix 218 can be an Audio Processing Object (APO) which is a Component Object Module (COM) interface, a basic OS software building block. Matrix 218 can perform a channel multiplex down operation from some number of channels to some lower number of channels for the corresponding audio device driven by driver 226, such as from four (4) channels down to two (2) channels.

From matrix 218, audio data flows to a format conversion module 220. From format conversion module 220, the audio data flows to an end point 222. From end point 222, audio data flows to a looped buffer 224 and from there to Master Audio Device Driver 226. From Master Audio Device Driver 226, data can be output to an output device (not shown) interfacing with kernel section 276. By way of example, the output device can be a two channel sound card, a Universal Serial Bus (USB) speaker set, a pair of TCP/IP speakers, another device that can accommodate the output of two channels of sound, etc.

The clock of the system timer is used to wake up an audio pump software component 203 so that audio data is processed by a local engine 210. The wake up time of the audio pump 203 can be adjusted in fine increments so that the rate that the local engine 210 produces audio data will match the rate that the audio device consumes the audio data. Stated otherwise, adjustments are made to the periodicity of the wake up period such that the audio pump 203 that calls the local engine 210 will wake up on a different period. For instance, the audio pump 203 can wake up shorter than a 10 ms wake up period for every wakeup period so as to adjust the wake up period when the clock of the audio device is faster than the system clock.

Environment 200a enables the local engine 210 to generate audio data for an audio device driven by driver 226 by synchronizing the timing of the audio pump's wake up to the clock of the audio device. The local engine 210 that generates the audio data is running off a reference clock (e.g. the clock of the system timer) that is provided by the operating system to the audio pump 203 that wakes up the local engine 210. The reference clock can be unrelated to and independent of the clock of the audio device. As such, the reference clock may not be synchronized with the clock of the audio device.

Environment 200a enables a process that synchronizes the reference clock (e.g., the clock of the system timer) with the rate at which the audio device is consuming or generating audio data (the render or capture rate of the audio device). This process can be an effective use of the audio system service of an operating system to match the rate of the audio device driven by a driver. As such, the process can avoid glitches caused by excess audio data in the audio buffer. Accordingly, the implementation provides lower and more predictable latency which would otherwise cause delay between when sound is suppose to be rendered and when the sound it is actually rendered by the audio device. Additionally, the implementation is not computationally intensive because it does not require a CPU-intensive sample rate conversion process.

Environment 200a in FIG. 2a represents one implementation in which temporary disruptions in the audio data stream can be prevented by working only with an audio device driven by driver 226. This implementation slaves the processing "wakeup" tick of the Audio Pump 203 to the hardware clock of the audio device by making adjustments to the wakeup period of the Audio Pump 203. By keeping the processing wakeup time closely related to the hardware clock of the audio device, the audio device will be a synchronized.

Environment 200a can be arranged for each of several audio devices, such as when there are three (3) sound cards. In this case, three applications would be playing back or recording separate audio data streams independently. As such, none of the sound cards would be a slave to or master of any other sound card.

Figure 2B:
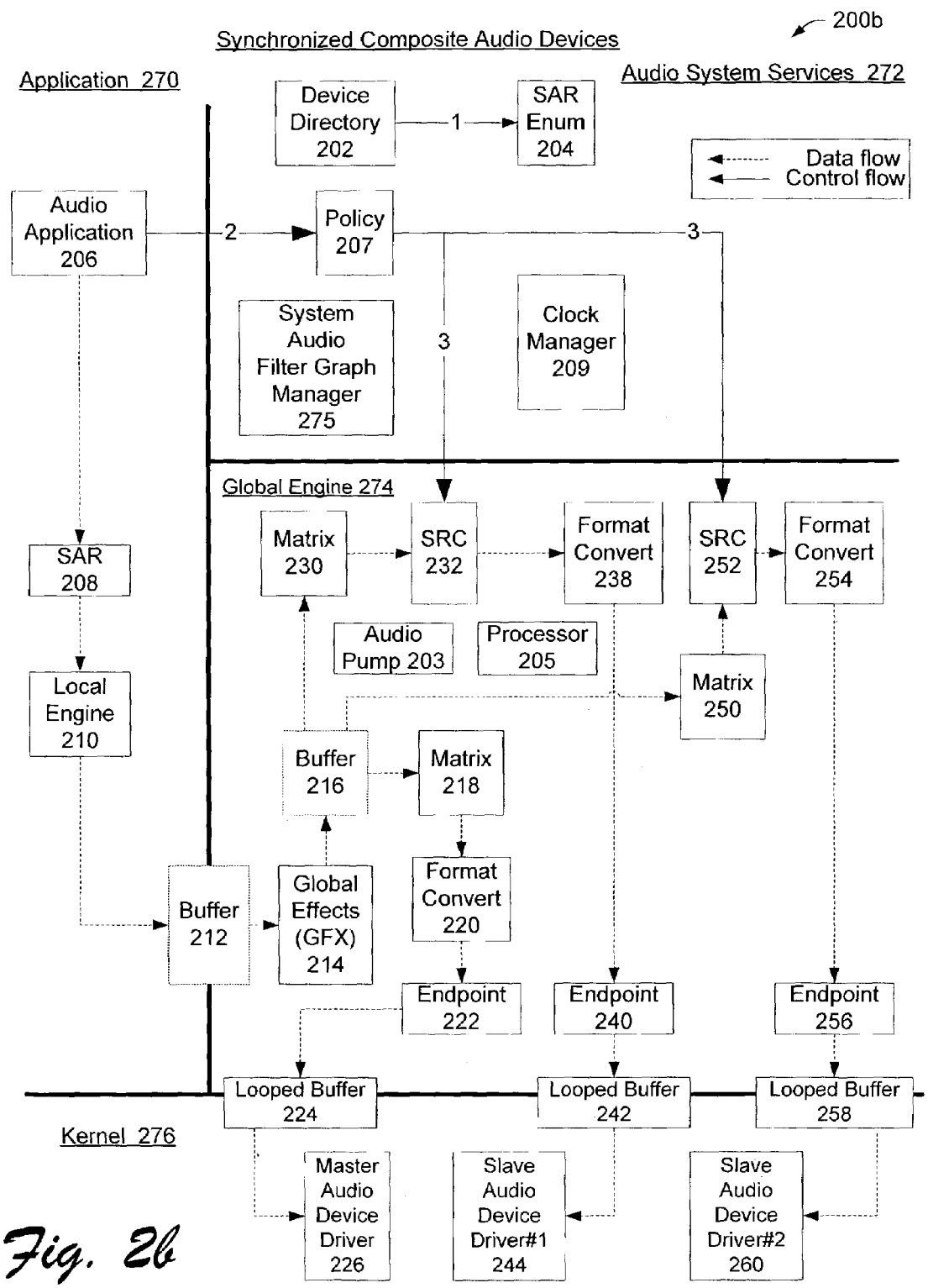
FIG. 2*b* shows an implementation in which an audio application is executing in a computer system having an operating system, where sound from the audio application is output using one master and two slave device drivers, and where the sound corresponding to the two slave device drivers is synchronized with the sound corresponding to the master device driver by the use of software.

Another implementation is depicted in FIG. 2b. An environment 200b seen in FIG. 2b is somewhat related to the environment 100b of FIG. 1b in that two (2) slave audio devices are slaved to a master audio device such that they function as a synchronized composite audio device. Environment 200b has four (4) sections that are delimited by the darker lines and include an application section 270, an audio system services section 272, a global engine section 274, and a kernel section 276. Application section 270 is serviced by audio system services section 272. The audio system services section 272 has a device directory 202 and a system audio filter graph manager 275. The global engine section 274 receives input from application section 270 and outputs to output devices (not shown) via a respective Master Audio Device Driver 226, slave device driver #1 244, and slave device driver #2 260. Included in the global engine section 274 is a processor 205. Processor 205 is intended to represent a name of an object that maintains a list of audio effects that are to be processed, where the object calls for these effects to be processed. In environment 200b, sound produced via slave device driver #1 244 and slave device driver #2 260 is synchronized with Master Audio Device Driver 226.

In FIG. 2b, the environment 200b has solid arrows that reflect the flow of control and dashed arrows indicate data flow. A Control Flow indicated with reference numeral '1' begins when device directory 202 passes a Control Flow instruction to streaming audio renderer (SAR) enumerator 204 to begin a process that is illustrated in environment 200b. SAR enumerator 204 inserts an audio device descriptor into device directory 202 that will represent the complex device that is made up of the master audio device and two slave audio devices that are respectively driven by the master and slave audio device drivers 226, 244, and 260. The Control Flow arrow at reference numeral '2' indicates that audio application 260 invokes a policy 207. Policy 207 is responsible for being able to describe and set up the desired graph in response to opening the complex device. Otherwise, most of the structure is set up in environment 200b by system audio filter graph manager 275. Additionally, policy 207 sets up respective clock references to variable rate Sample Rate Converter (SRC) 232 and SRC 252 in order to keep the master and slave devices of the complex device synchronized. Policy 207 has a Control Flow referenced as numeral 3 in FIG. 2b from the audio system services section 272 of environment 200b to the global engine section 274 and interfacing with both SRC 232 and SRC 252. The Control Flows at reference No. 3 indicates that audio application 206 opens the complex device that corresponds to the audio device descriptor in the device directory 202. From the perspective of audio application 206, the complex device is logically similar to a simple device.

SRC 232 and SRC 252 perform variable rate sample rate conversions on audio data. These conversions by SRC 232 and SRC 252 are used to handle any clock differences between the two different devices that are driven by Slave Audio Device Driver #1 244 and Slave Audio Device Driver #2 260. Any different audio data processing rates of these two different devices may be similarly handled by SRC 232 and SRC 252.

It is the responsibility of SRC 232 and SRC 252 to keep an input clock synchronized with the clock of their respective slave audio devices. By way of example, when an input clock is exported by a Clock Manager 209, a call is made by the Clock Manager 209 for an estimate of a sampling rate. The Clock Manager 209 allows the SRC 232 and the SRC 252 to find out the chronological relationship between the different clocks of the audio devices respectively associated with the Slave Audio Device Driver # 1 244 and the Slave Audio Device Driver # 260. As such, the time at these clocks will be a factor effecting the operation of the corresponding variable rate SRC. These clock times will be used to determine how fast each SRC 232, 252 should be consuming an audio stream data versus how fast each SRC 232, 252 should be generating an audio stream data. This determination can be made by interfacing each SRC 232, 252 with the with the Clock Manager 209 to ascertain the difference between the time at the clock of the master hardware device associated with the Master Audio Device Driver 226 and the time at the clock of the slave hardware device associated with the Slave Audio Device Driver 244, 260.

In one implementation, a memory mapped register can be used to store the time of each clock of each hardware device at a location in a memory. Each such memory location is assessable to the Clock Manager 209. The Clock Manager 209 accesses each memory address corresponding to each clock to read the time corresponding to clock. By polling the ticking of each corresponding clock that is mapped into a memory location, the Clock Manager 209 can provide correlations between different hardware devices. In essence, each such access is deemed by the relevant software as a register read.

Upon obtaining the estimated sampling rate, the SRC 232 can maintain the synchronization with the slave audio device driven by Slave Audio Device Driver #1 244 by performing an appropriate variable rate sample rate conversion dictated by the time at looped buffer 242 and the time at a clock of the corresponding slave audio device. Similarly, the estimated sampling rate is used by the SRC 252 to maintain the synchronization with the slave audio device driven by Slave Audio Device Driver #2 260 by performing an appropriate variable rate sample rate conversion dictated by the time at looped buffer 258 and the time at a clock of the corresponding slave audio device. The input clock used for audio synchronization can be an audio device clock, a video device clock, or some arbitrary derived clock. All clocks specified to the audio system services section 272 can be registered with the Clock Manager 209 prior to the Control Flows 1-3 and the Clock Manager 209 can correlate the system time to these clocks. The clock that is exported by the Clock Manager 209 includes a memory-mapped hardware register that ticks off the hardware time. Clock Manager 209 is responsible for reporting to clients the correlation between a reference clock (usually the system timer) and the clock of a hardware device.

In environment 200b of FIG. 2b, audio data flows from audio application 206 to Streaming Audio Renderer (SAR) 208. SAR 208 renders audio data to local engine 210 which in turn outputs audio data to buffer 212 for entry into the global engine section 274. In the global engine section 274, audio data flows to a global effects module (GFX) 214. Any of various signal processing can be performed by GFX 214 to accomplish a global effect on a mix of audio data streams that have been received in the global engine section 274. GFX 214 outputs the audio data it has processed to a buffer 216 from which the audio data flows in three (3) different directions. These three directions are, respectively, to a Master Audio Device Driver 226 and to two (2) slave audio device drivers 244, 260. Each of the three directions is discussed below.

In the first direction, data flows to a matrix 218 from buffer 216. From matrix 218, audio data flows to a format conversion module 220. From format conversion module 220, the audio data flows to an end point 222. From end point 222, audio data flows to a looped buffer 224 and from there to Master Audio Device Driver 226. From Master Audio Device Driver 226, data can be output to an output device (not shown) interfacing with kernel section 276. By way of example, the output device can be a two channel sound card, a Universal Serial Bus (USB) speaker set, a pair of TCP/IP speakers, or another device that can accommodate the output of two channels of sound.

In the second direction, data flows to a matrix 230 from buffer 216. From matrix 230, audio data flows to SRC 232 and then to a format conversion module 238. Effects other than the SRC 232 are contemplated, including a volume mix down, a channel mix down, etc. From format conversion module 238, the audio data flows to an end point 240. From end point 240, audio data flows to a looped buffer 242 and from there to Slave Audio Device Driver #1 244. Slave device driver #1 244 can output to an output device (not shown) interfacing with kernel section 276, similar to Master Audio Device Driver 226.

In the third direction, data flows to a matrix 250 from buffer 216. From matrix 250, audio data flows to SRC 252. Effects other than the SRC 252 are contemplated, including a volume mix down, a channel mix down, etc. From SRC 252, audio data flows to a format conversion module 254. From format conversion module 254, the audio data flows to an end point 256. From end point 256, audio data flows to a looped buffer 258 and from there to Slave Audio Device Driver #2 260. Slave device driver #2 260 can output to an output device (not shown) interfacing with kernel section 276, similar to Master Audio Device Driver 226.

The three (3) matrix blocks 218, 230, and 250 are Audio Processing Objects (APO). Each APO is a Component Object Module (COM) interface, a basic OS software building block. Matrices 218, 230, and 250 perform channel multiplex down operations from some number of channels to some lower number of channels for each audio device, such as from six (6) channels down to two (2) channels.

Environment 200b in FIG. 2b represents an implementation in which temporary disruptions in an audio data stream can be prevented by the slaving the hardware clocks of each slave audio device driven by drivers 244, 260 to the clock of the master audio device driven by driver 226. The variable rate SRCs 232, 252 are used to keep the slave audio devices in synchronization with the master audio device. The processing on the slave audio device is slaved to the master audio device by a correlation between the hardware clocks thereof and a reference clock assessable to the Clock Manager 209. This correlation is then used to determine and set the appropriate output rate on SRCs 232, 252 so that the slave devices will consume samples at the actual rate of the master device. In essence, this implementation locks the software processing taking place in the global audio engine section 274 to the three physical audio devices driven by drivers 226, 244, and 260 in order to make them appear as a single audio device.

Figure 2C:
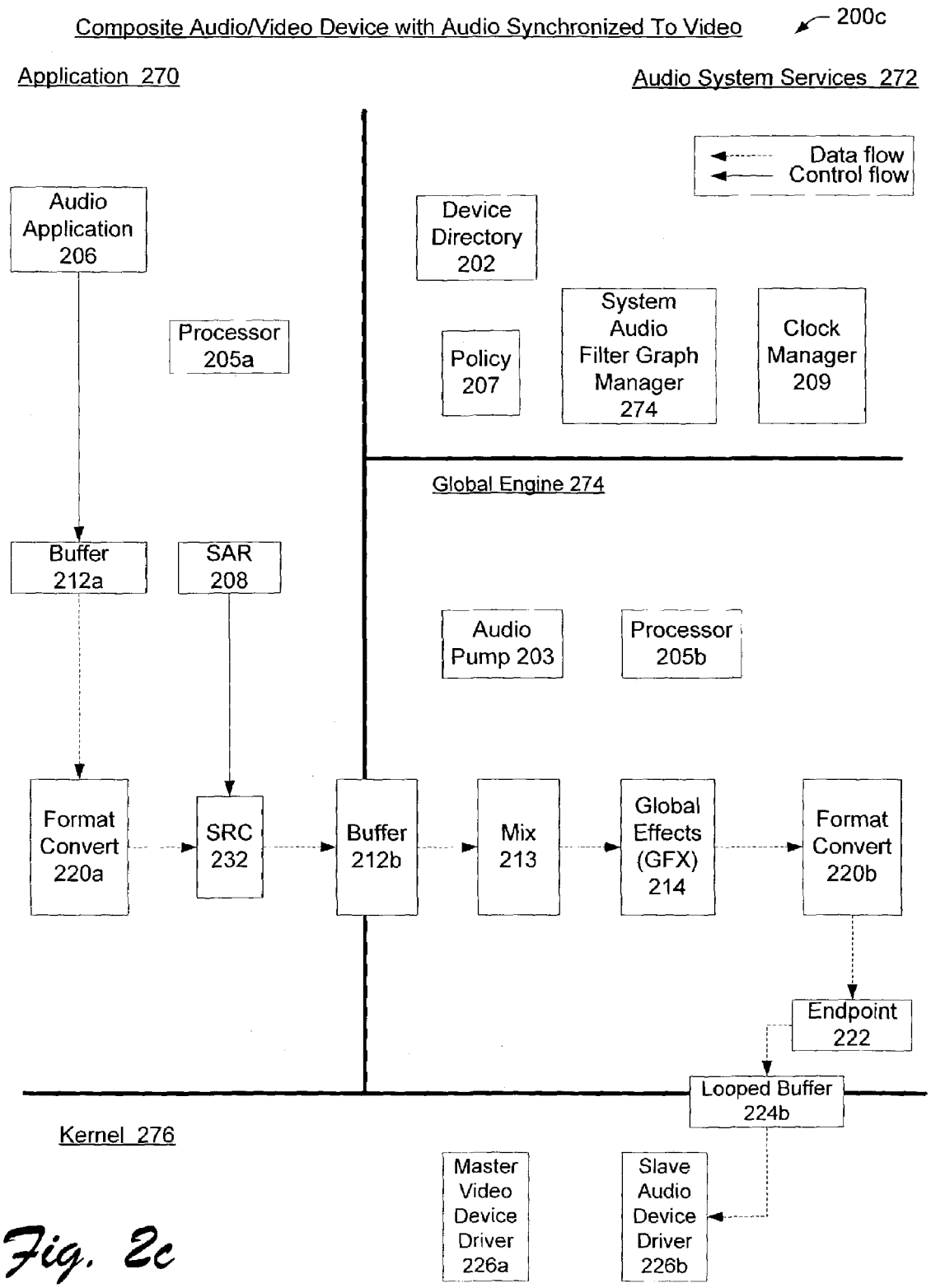
FIG. 2*c* shows an implementation in which an audio visual application (AV) is executing in a computer system having an operating system, where video from the AV is output using a master video device driver and sound from the AV is output using a slave audio device driver, and where the sound of the audio device driver is synchronized with the video of the video device driver.

FIG. 2c shows an environment 200c in which an audio visual application (AV) is executing in a computer system having an operating system. An arrangement in which environment 200c might be implemented is seen in FIG. 1a in environment 100a. In this case, the audio services component 116 of FIG. 1a would be similar in the components thereof as the audio services component 116 of FIG. 1b. In reference to FIGS. 1a and 2c, video data from the AV is output using a Video Card 102B that is driven by a Master Video Device Driver 102A, 226a. Sound from the AV is output using a Slave Audio Device Driver 104A, 226b. The sound is synchronized with the video. By way of example, a DVD can be played back in A-V 120 of PC 122 such that the audio data being rendered from the DVD is synchronized with the video data being rendered from the DVD.

Environment 200c enables Video Card 102B driven by the Master Video Device Driver 102A, 226a to be the master device. The slave device is a Streaming Audio Renderer (SAR) 208 that is slaved to the Video Card 102B. Video data is not fed to the Master Video Device Driver 102A, 226a using a variable rate sample rate converter, but audio data does flow to the Slave Audio Device Driver 102A, 226b through SRC 232 seen in FIG. 2c. SRC 232 receives audio data from the SAR 208 for the Sound Card 104B driven by driver 104A, 226b. The stream of audio data for the Sound Card 104B is being slaved so that audio being played out of the Sound Card 104B with its own free running clock is synchronized with the video that is coming out on monitor 102C via the Video Card 102B with the Video Card's own free running clock. To do this, SRC 232 under the SAR 208 obtains an estimate of the rate at which a local engine is generating audio data for a buffer 212b. This rate estimate is then used to set the sample rate for the SRC 232 seen in FIG. 2c so that the audio data that is generated by the SRC 232 matches the rate of the Video Card 102B. The Control Flow from the SAR 208 to the SRC 232 is set to a reference clock with the SRC 232 so that that audio data stream stays synchronized with the video data for the Video Card 102B. A Clock Manager 209 is used to register the relevant clocks for mapping into memory. The software polls the registers that are mapped into memory to get the clock correlation. The clock correlation is input to the SRC 232 for the Sound Card 104B driven by the Slave Audio Device Driver 104A, 226b so that the SRC 232 can make sure that the rate at which the Sound Card 104B is consuming audio data matches the rate at which the Video Card 102B is consuming video data. Accordingly, the operator 110 will hear sound from speakers 106D, 108D that matches the picture seen on Monitor 102C.

The SRC 232 seen in FIG. 2c is responsible for keeping the input clock as referenced in the stream object synchronized with the hardware clock of the Sound Card 104A driven by the Slave Audio Device Driver 104B, 226b. This is done by performing the appropriate variable sample rate conversion with SRC 232 as dictated by the time of the audio data stream and the time of the Sound Card 104B. This synchronization of the audio data with the video data is accomplished by specifying a "master clock" as the reference clock in the audio data stream. The master clock is the time for both the audio and video data streams. This master clock can be a hardware clock for any one of the Sound Card 104B, the Video Card 102B, or it can be some arbitrary derived clock. All clocks specified to the audio system can be registered and unregistered with the Clock Manager 209 as they are respectively added and removed. The Clock Manager 209 can correlate the system time to the registered clocks.

Figure 3A:
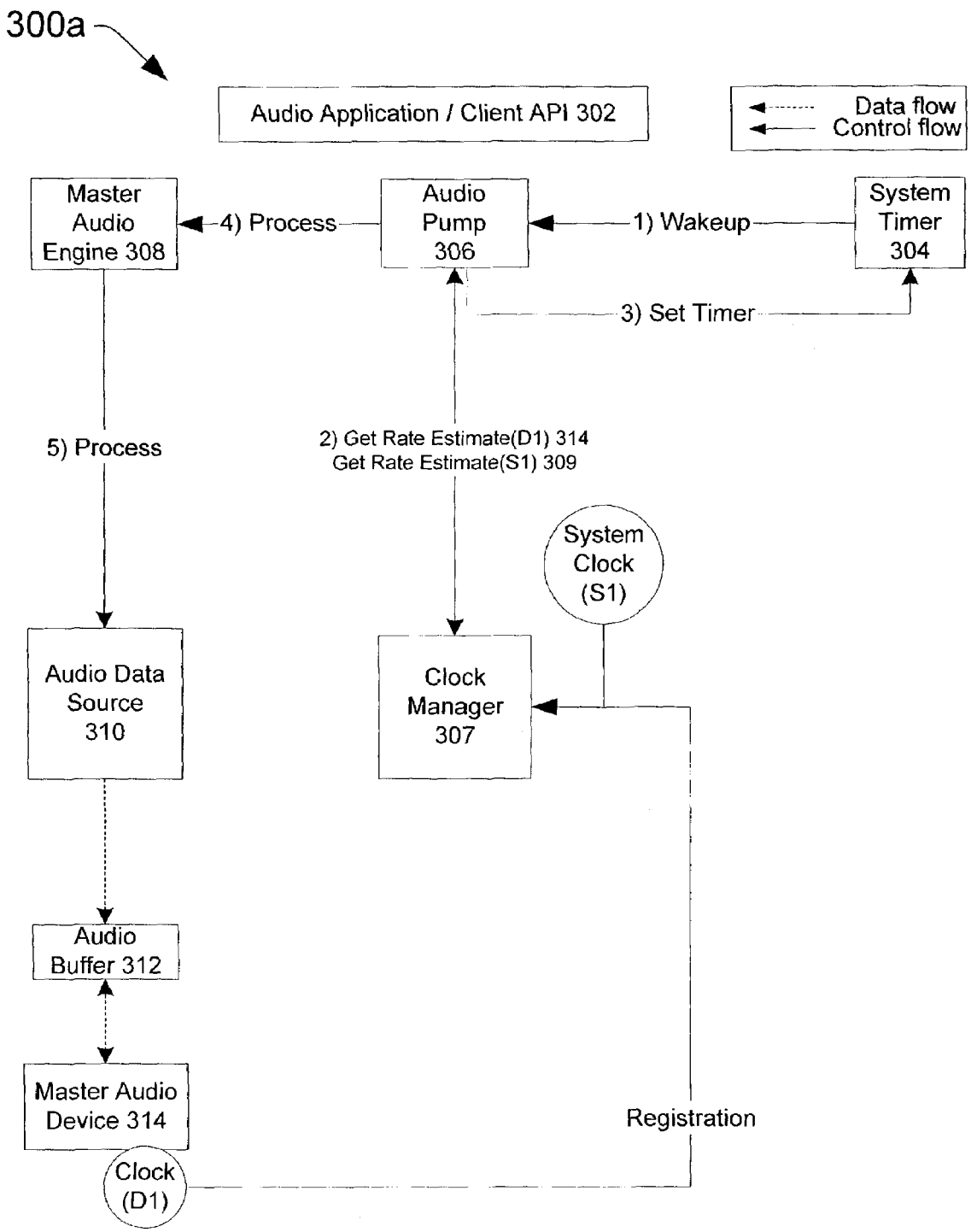
FIG. 3*a* shows a flow chart that further illustrates the implementation depicted in FIG. 2*a*, and illustrates a method in which an audio application has a client Application Program Interface (API) that calls for the production of sound using an audio device, and where the sound rendered by the audio device is synchronized with a reference clock.

FIG. 3a shows a method 300a that is somewhat related to environment 200a in that sound rendered by an audio device having a clock can be synchronized with a reference clock that is independent of the clock of the audio device. The reference clock can be the clock of a system timer. Method 300a depicts how a clock D1 of a Master Audio Device 314 can be correlated with a clock S1 of a system timer 304.

An audio application/client API 302 creates and configures several of the main components that are used in an audio hardware slaving operation of method 300a. The main components in FIG. 3a that are created and configured by the audio application/client API 302 include an Audio Buffer 312, an Audio Data Source 310, an Audio Pump 306, a Master Audio Engine 308, and other software components (not shown).

After the audio application/client API 302 has completed the foregoing creation and configuration, the Audio Pump 306 wakes up from the system timer 304 as indicated by the "wakeup" Control Flow at reference numeral '1'. As indicated by the Control Flow at reference numeral '2', the Audio Pump 306 gets rate estimates from the Clock Manager 307 so that the Audio Pump 306 can calculate the next wakeup time as indicated by the Control Flow "Get Rate Estimate (D1) 314" and the "Get Rate Estimate (S1) 309. The Clock Manager 307 serves the function of maintaining a registry of all clocks. As such, the System Clock S1 and the clock D1 of the Master Audio Device 314 are registered and unregistered with the Clock Manager 307 as they are added and removed, respectively. The System Clock S1 gives the system time and can be used as a reference in the present implementation. Accordingly, the Clock Manager 307 can correlate the system time given by the System Clock S1 to the clock D1 of the Master Audio Device 314.

After the Audio Pump 306 has obtained the rate estimates from the Clock Manager 307, the Audio Pump 306 can then set its next wakeup event. By setting the next wake up event of the Audio Pump 306, the Audio Pump 306 will be synchronized with the Master Audio Device 314. This synchronization is indicated by the "Set Timer" Control Flow at reference numeral '3'. The Audio Pump 306 calls "Process" on the Master Audio Engine 308 as indicated by the Control Flow at reference numeral '4' to initiate the processing audio data. The Master Audio Engine 308 calls "Process" on the Audio Data Source 310 as indicated by the Control Flow at reference numeral '5', which fills the Audio Buffer 312 of the Master Audio Device 314.

The Audio Data Source 310 can contain audio data that has been captured from a microphone (e.g., a microphone capture file). A network audio steam capture file or another audio data file can be contained in Audio Data Source 310. The audio data file in the Audio Data Source 310 can be representative of an audio data stream in the Dolby® 5.1 format, or an audio data stream representative of the beep and clicks (e.g., system sounds) generated by the operating system. Alternatively, the Audio Data Source 310 can contain a synthesizer file that can be used to generate audio data on the fly. For instance, data in the Audio Data Source 310 can be similar to sine waves that are mathematically generated by calculating what the values would be at each sample position in the sine wave. The Master Audio Device 314 can be a render device that can read meta data from the Audio Buffer 312 to generate PCM audio data based upon Musical Instrument Digital Interface (MIDI) data. For example, the meta data in the file of the Audio Data Source 310 can provide an instruction to the Master Audio Device 314 to generate a middle C note for three seconds at a certain volume level.

The Control Flow indicated by reference numerals 1-5 in FIG. 3a represent one implementation in which temporary disruptions in an audio data stream can be prevented by working only with the Master Audio Device 314. This implementation slaves the processing "wakeup" tick of the Audio Pump 306 to the hardware clock D1 of the Master Audio Device 314 by making adjustments to the wakeup period. The adjusted wakeup period keeps the processing wakeup time closely related to the hardware clock D1 of the Master Audio Device 314 so that the Master Audio Device 314 will be synchronized.

Method 300a in FIG. 3a enables the Master Audio Engine 308 to generate audio data for the Master Audio Device 314 by synchronizing the timing of the wake up of the audio pump 306 to the clock D1 of the Master Audio Device 314. The Master Audio Engine 308 that generates the audio data is running off a reference clock (e.g. the clock S1 of the system timer 304) that is provided by the operating system to the Audio Pump 306 that wakes up the Master Audio Engine 308. The reference clock S1 can be unrelated to and independent of the clock D1 of the Master Audio Device. As such, the reference clock S1 might not be synchronized with the clock D1 of the Master Audio Device 314.

Method 300a synchronizes the reference clock S1 with the rate at which the Master Audio Device 314 is consuming or generating audio data (the render or capture rate of the Master Audio Device 314). Method 300a can be an effective use of the audio system service of an operating system to match the rate of the Master Audio Device 314. As such, the method 300a can avoid glitches caused by excess audio data in the Audio Buffer 312. Accordingly, method 300a provides lower and more predictable latency which would otherwise cause delay between when sound is suppose to be rendered and when the sound it is actually rendered by the audio device. Additionally, the process is not computationally intensive because it does not require a variable rate sample rate conversion process.

Master audio devices 314 in FIG. 3a can be used to capture (record) audio data. To illustrate this case, the direction of the single arrow dashed lines from the audio buffer 312 to the Audio Data Source 310 would be reversed and none of the arrows of the Control Flows 1-5 would be reversed.

Figure 3B:
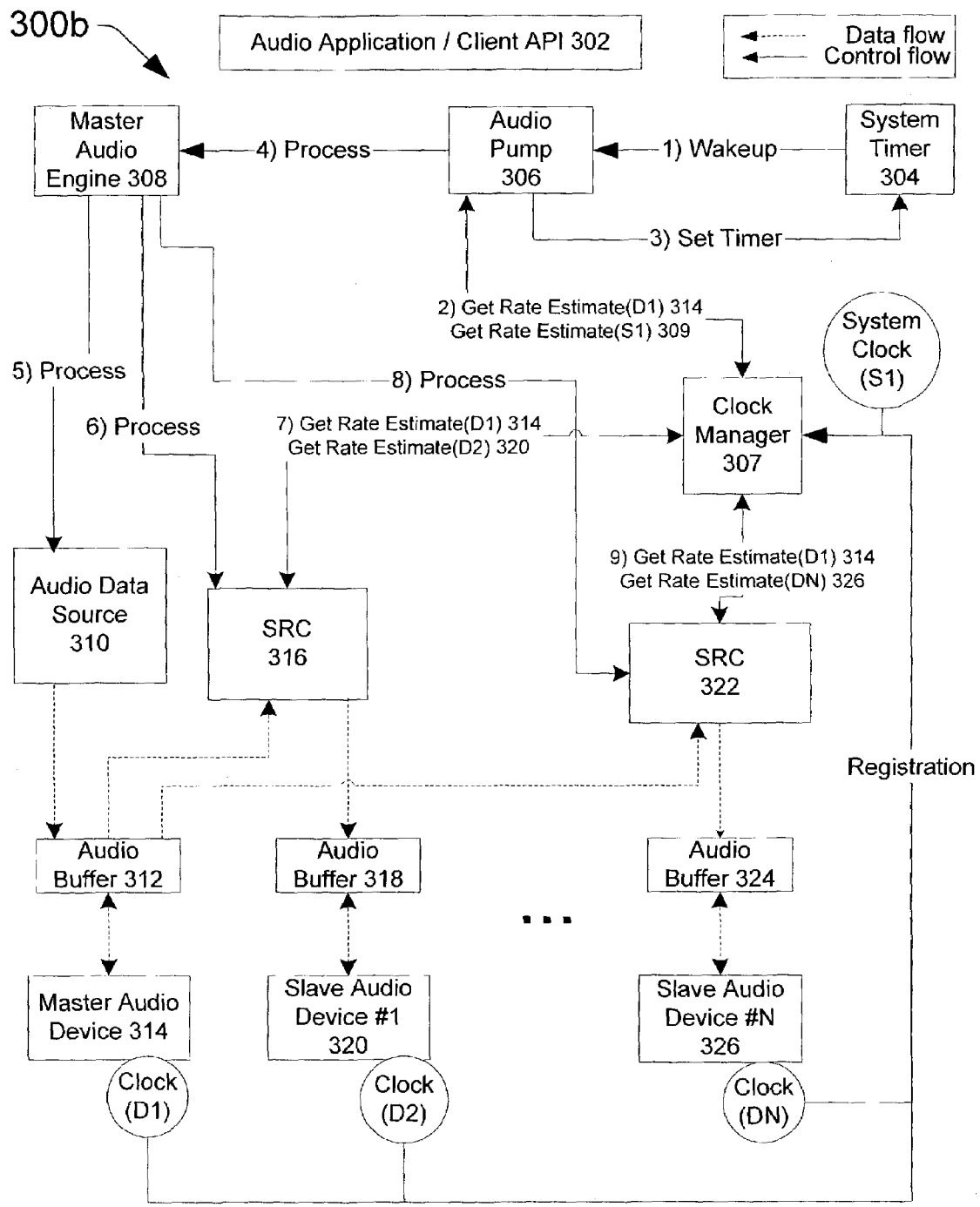
FIG. 3b shows a flow chart that further illustrates the implementation depicted in FIG. 2b, and illustrates a method in which an audio application has a client Application Program Interface (API) that calls for the production of sound using one master and two slave audio devices, and where the sound from each of the two slave audio devices is synchronized with the sound of the master audio device.

Another implementation is depicted in FIG. 3b. A method 300b seen in FIG. 3b is somewhat related to environments 100b and 200b of FIGS. 1b and 2b, respectively, in that two (2) slave audio devices are slaved to a master audio device such they function as a synchronized composite audio device. Method 300b establishes a composite device that is used to produce sound. The composite device is a single virtual audio device that is formed by a grouping of the physical devices represented by a master audio device 314, a slave audio device #1 320 and at least one other slave audio device #N 326. From the perspective of an audio application/client API 302, the composite device looks like any other physical device, only it has the capabilities of more than any one physical device.

The audio application/client API 302 creates and configures several of the main components that are used in an audio hardware slaving operation. The main components in FIG. 3b that are created and configured by the audio application/client API 302 include the Audio Buffers 312, 318, 324, the Audio Data Source 310, the SRCs 316, 322, the Audio Pump 306, the Master Audio Engine 308, and other software components (not shown). Calls are made by the audio application/client API 302 to initialize synchronization between the Audio Pump 306 and the Master Audio Device 314. The audio application/client API 302 also makes calls to initialize synchronization between the SRCs 316 through 322 and their corresponding devices 320 through 326.

After the audio application/client API 302 has completed the foregoing setup, the Audio Pump 306 wakes up from the system timer 304 as indicated by the "wakeup" Control Flow at reference numeral '1'. As indicated by the Control Flow at reference numeral '2', the Audio Pump 306 gets rate estimates from the Clock Manager 307 so that the Audio Pump 306 can calculate the next wakeup time as indicated by the Control Flow "Get Rate Estimate (D1) 314" and the "Get Rate Estimate (S1) 309. The Clock Manager 307 serves the function of maintaining a registry of all clocks. As such, a System Clock S1, a clock D1 of the Master Audio Device 314 and the clocks D2 through DN of the Slave Audio devices #1 320 through Slave Audio devices #N 326, respectively, are registered and unregistered with the Clock Manager 307 as they are added and removed, respectively. The System Clock S1 gives the system time and can be used as a reference in the present implementation. Accordingly, the Clock Manager 307 can correlate the system time given by the System Clock S1 to the clock D1 of the Master Audio Device 314.

After the Audio Pump 306 has obtained the rate estimates from the Clock Manager 307, the Audio Pump 306 can then set its next wakeup event. By setting the next wake up event of the Audio Pump 306, the Audio Pump 306 will be synchronized with the Master Audio Device 314. This synchronization is indicated by the "Set Timer" Control Flow at reference numeral '3'. The Audio Pump 306 calls "Process" on the Master Audio Engine 308 as indicated by the Control Flow at reference numeral '4' to initiate the processing of audio data. The Master Audio Engine 308 calls "Process" on the Audio Data Source 310 as indicated by the Control Flow at reference numeral '5', which fills the Audio Buffer 312 of the Master Audio Device 314. The Audio Data Source 310 can be a file that provides audio data.

In order for the Master Audio Device 314 to be synchronized with one or more slave audio devices 320 through 326, several actions can be taken as follows. To synchronize the Master Audio Device 314 with the Slave Audio Device #1 320, Control Flows 6-7 are executed. The Master Audio Engine 308 calls "Process" on the SRC 316 for Slave Audio Device #1 320 as indicated by the Control Flow at reference numeral '6'. The SRC 316 gets rate estimates from the Clock Manager 307, adjusts the output sampling rate of SRC 316, and does the sampling rate conversion as indicated by the Control Flow "Get Rate Estimate (D1) 314" and the "Get Rate Estimate (D2) 320 at reference numeral '7'.

The steps seen in Control Flows 6 and 7 are repeated for each subsequent slave audio device 'n'. For example, for slave audio device 'N', the Master Audio Engine 308 calls "Process" on the SRC 322 for Slave Audio Device #2 326 as indicated by the Control Flow at reference numeral '8'. The SRC 322 gets rate estimates from the Clock Manager 307, adjusts the output sampling rate of SRC 322, and does the sampling rate conversion as indicated by the Control Flow "Get Rate Estimate (D1) 314" and the "Get Rate Estimate (DN) 326 at reference numeral '9'.

The Control Flows indicated by reference numerals 6-7 and 8-9 in FIG. 3*b* each represent an implementation in which temporary disruptions in the audio data stream can be prevented by slaving an unrelated clock of a slave audio device 320, 326 to the clock D1 of a master audio device 314 using a variable rate SRC 316, 322 to keep the slave audio device 320, 326 in synchronization with the master audio device 314. The audio output on the slave audio device 320, 326 is synchronized to the output of the master audio device 314 by using correlations between the hardware clocks thereof and the reference System Clock S1. This correlation is then input into the variable rate SRC 316, 322 so that the slaved audio devices 320, 326 will consume samples at the actual rate of the master audio Device 314. In essence, this implementation locks the global audio engine software processing to one or more physical audio devices in order to make them appear as a single audio device.

In method 300*b*, differences (correlations) are found between the clock D2-DN of each slave device 320-326 and the clock D1 of the master device 314 (via the clock S1 of the System Timer 304). The operation of the SRC of each slave device is adjusted for this correlation so that the SRC will consume data at the rate of the master device 314 and will generate data at the rate of its corresponding slave device. To do so, the clock D1 of the master device 314 is synchronized with the clock S1 of the system timer 304. This assures that the SRC will generate data for its slave device at a rate that matches the rate of the master device 314 according to the clock D1 of the master device 314.

Each of the audio devices 314 and 320 through 326 can be used to capture (record) audio data. To illustrate this case, the direction of all single arrow dashed lines in FIG. 3*b* would be in the opposite direction and none of the arrows of the Control Flows 1-9 would be reversed.

Figure 4:
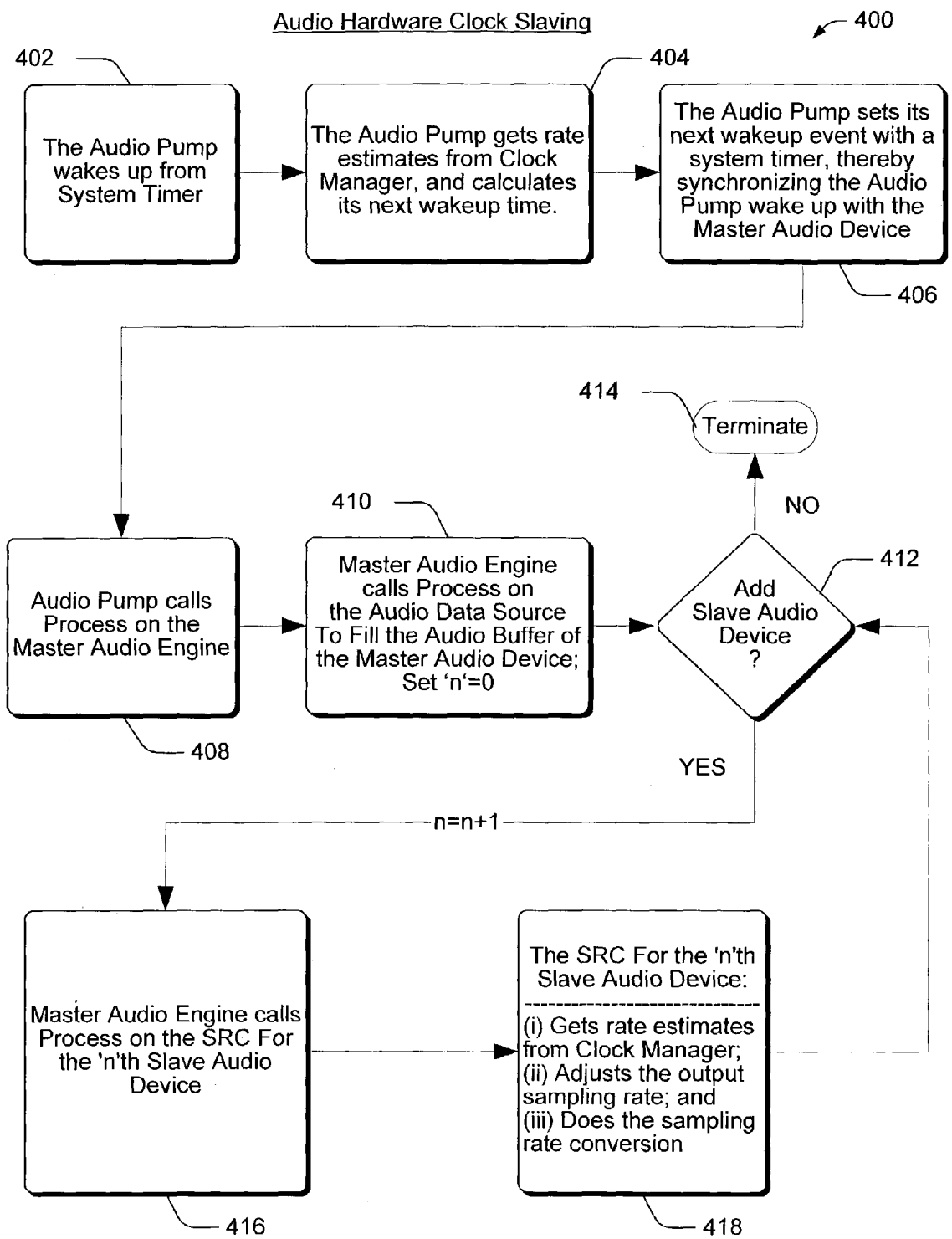
FIG. 4 shows a flow chart that is useful for understanding the exemplary method depicted in FIGS. 3a-3b.

FIG. 4 shows a flow chart that illustrates a method 400. Method 400 features blocks 402-410 that illustrate aspects of the slaving of the wakeup period of an audio pump to a clock of an audio device that acts as a master by adjusting the wakeup period as discussed above with respect to environment 200*a* and method 300*a*. Blocks 412-418 of method 400 further illustrate aspects of environment 200*b* and method 300*b* in that an audio hardware clock slaving process is accomplished in which sound produced using one or more slave audio devices is synchronized with sound produced by a master audio device by use of a clock and SRC. Method 400 begins at block 402 where the audio pump receives a wake up instruction from the system timer. By way of example, Control Flow 1 seen in FIG. 3*b* illustrates Audio Pump 306 receiving such an instruction from System Timer 304.

Method 400 moves from block 402 to block 404 where the Audio Pump gets rate estimates from the Clock Manager. A wake up time is then calculated by the Audio Pump. The calculated wakeup time will be next time that the Audio Pump is to wake up. By way of example, Control Flow 2 seen in FIG. 3*b* illustrates an interface between Audio Pump 306 and Clock Manager 307 during which a rate estimate is obtained for clock D1 of Master Audio Device 314 and a rate estimate is obtained for the System Clock S1.

Method 400 moves from block 404 to block 406 where the Audio Pump sets its next wakeup event with a system timer, thereby synchronizing with the next wake up event of the Audio Pump with the Master Audio Device. By way of example, Control Flow 3 seen in FIG. 3*b* illustrates a communication from the Audio Pump 306 for setting the System Timer 304.

Method 400 moves from block 406 to block 408 where the Audio Pump calls Process on the Master Audio Engine. By way of example, Control Flow 4 seen in FIG. 3*b* illustrates a communication from the Audio Pump 306 to the Master Audio Engine 308. Method 400 then moves to block 410 where the Master Audio Engine calls Process on the Audio Data Source to fill the Audio Buffer of the Master Audio Device. A variable 'n' is then initialized (e.g., set n=0). By way of example, Control Flow 5 seen in FIG. 3*b* illustrates a communication from the Master Audio Engine 308 to the Audio Data Source 310.

Method 400 moves from block 410 to block 412 where it is determined whether a Slave Audio Device is to be synchronized with the Master Audio Device. If not, then method 400 terminates at block 414. If one or more Slave Audio Devices are to be added, then the variable n is incremented (e.g., n=n+1) and method 400 moves to block 416 where the Master Audio Engine calls Process on the SRC for the Slave Audio Device 'n'. By way of example, Control Flow 6 seen in FIG. 3b illustrates a communication from the Master Audio Engine 308 to the SRC 316. Method 400 moves from block 416 to block 418 where a procedure is performed for the 'n'th Slave Audio Device by the corresponding SRC. First, rate estimates are obtained from the Clock Manager by the SRC. Then, the SRC adjusts the output sampling rate and does a sample rate conversion. The procedure performed by the SRC assures that the rate at which the 'n'th Slave Audio Device is consuming or generating audio data is synchronized with that of the Master Audio Device. By way of example, SRC 316 is shown in FIG. 3b as having a data flow to the Audio Buffer 318 for the Slave Audio Device #1 320 after having received a data flow from the Audio Buffer 312 for the Master Audio Device 314. Then, Control Flow 7 seen in FIG. 3b illustrates an interface between the SRC 316 and the Clock Manager 307 during which a rate estimate is obtained for clock D1 of Master Audio Device 314 and a rate estimate is obtained for the clock D2 of the Slave Audio Device #1 320.

Method 400 moves back to block 412 where it is determined whether another Slave Audio Device is to be synchronized with the Master Audio Device. If not, then method 400 terminates at block 414. If one or more Slave Audio Devices are to be added, then the variable n is incremented (e.g., n=n+1) and method 400 repeats blocks 416 and 418. Blocks 412 through 418 will be repeated for each such Slave Audio Device that is to be added. By way of example of the Slave Audio Device #N 326 being added, Control Flow 8 seen in FIG. 3b illustrates a communication from the Master Audio Engine 308 to the SRC 322. Method 400 moves from block 416 to block 418 where a procedure is performed for the Slave Audio Device #N 326 by the corresponding SRC 322. First, rate estimates are obtained from the Clock Manager 307 by the SRC 322. Then, the SRC 322 adjusts the output sampling rate and does a sample rate conversion. The procedure performed by the SRC 322 assures that the rate at which the Slave Audio Device #N 326 is consuming or generating audio data is synchronized with that of the Master Audio Device 314. As shown in FIG. 3b, the Audio Buffer 324 for the Slave Audio Device #N 326 has a data flow from SRC 322 after SRC 322 has received a data flow from the Audio Buffer 312 for the Master Audio Device 314. Then, Control Flow 9 seen in FIG. 3b illustrates an interface between the SRC 322 and the Clock Manager 307 during which a rate estimate is obtained for clock D1 of Master Audio Device 314 and a rate estimate is obtained for the clock DN of the Slave Audio Device #N 326.

Exemplary Computing System and Environment

Figure 5:
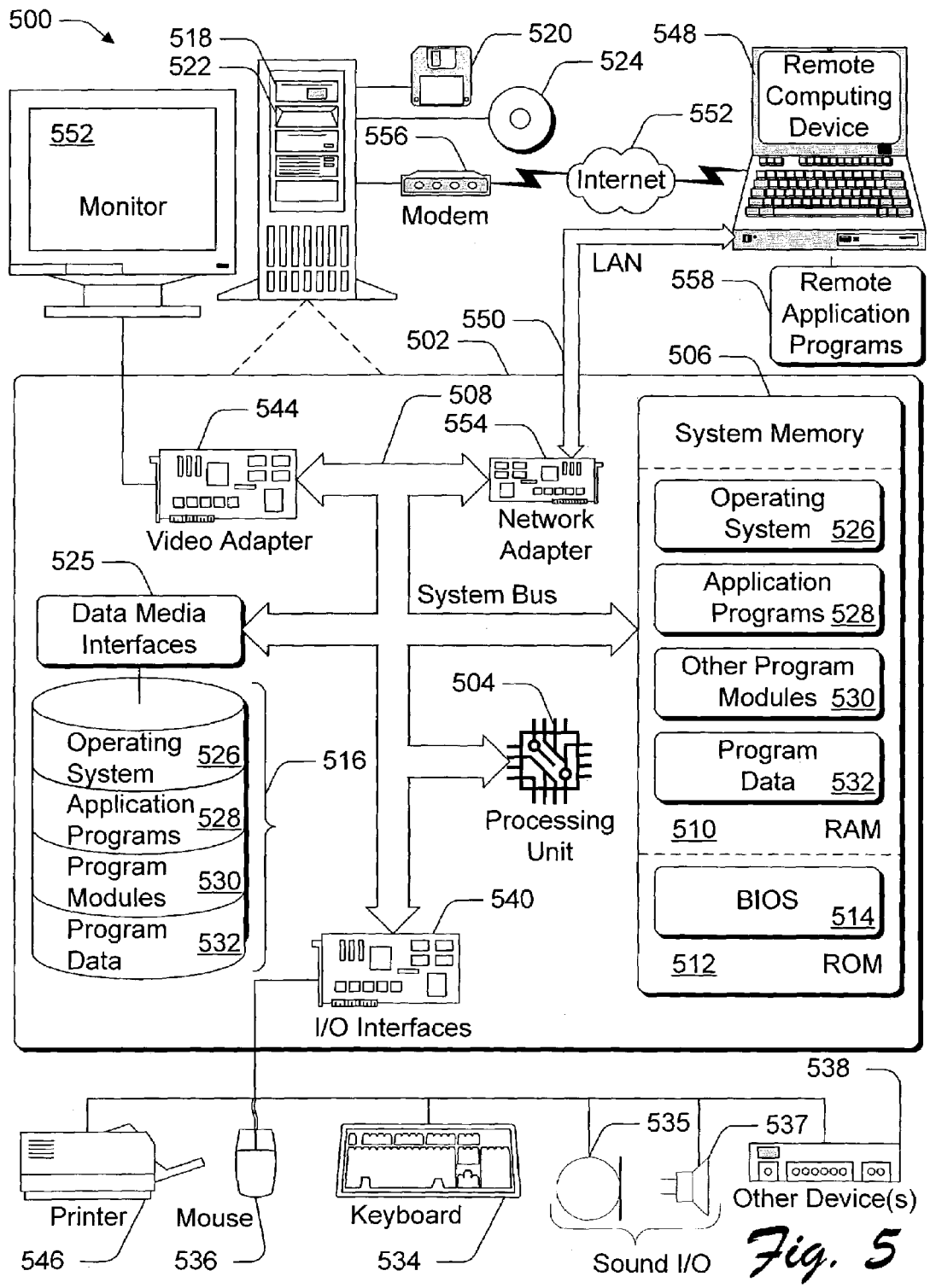
FIG. 5 illustrates an example of a computing environment within which the computer, network, software applications, methods and systems described herein can be either fully or partially implemented.

FIG. 5 illustrates an example of a computing environment 500 within which the applications, including a real time communication application (RTC) for PC telephony and a media player application (MP), described herein can be either fully or partially implemented. Exemplary computing environment 500 is only one example of a computing system and is not intended to suggest any limitation as to the scope of use or functionality of the network architectures. Neither should the computing environment 500 be interpreted as having any dependency or requirement relating to any one or combination of components illustrated in the exemplary computing environment 500.

The computer and network architectures can be implemented with numerous other general purpose or special purpose computing system environments or configurations. Examples of well known computing systems, environments, and/or configurations that may be suitable for use include, but are not limited to, personal computers, server computers, thin clients, thick clients, hand-held or laptop devices, multiprocessor systems, microprocessor-based systems, set top boxes, programmable consumer electronics, network PCs, mini-computers, mainframe computers, gaming consoles, distributed computing environments that include any of the above systems or devices, and the like.

The applications (including the RTC and the MP) may be described in the general context of computer-executable instructions, such as program modules, being executed by a computer. Generally, program modules include routines, programs, objects, components, data structures, etc. that perform particular tasks or implement particular abstract data types. The applications (including the RTC and the MP) may also be practiced in distributed computing environments where tasks are performed by remote processing devices that are linked through a communications network. In a distributed computing environment, program modules may be located in both local and remote computer storage media including memory storage devices.

The computing environment 500 includes a general-purpose computing system in the form of a computer 502. The components of computer 502 can include, but are not limited to, one or more processors or processing units 504, a system memory 506, and a system bus 508 that couples various system components including the processor 504 to the system memory 506.

The system bus 508 represents one or more of any of several types of bus structures, including a memory bus or memory controller, a peripheral bus, an accelerated graphics port, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

Computer system 502 typically includes a variety of computer readable media. Such media can be any available media that is accessible by computer 502 and includes both volatile and non-volatile media, removable and non-removable media. The system memory 506 includes computer readable media in the form of volatile memory, such as random access memory (RAM) 510, and/or non-volatile memory, such as read only memory (ROM) 512. A basic input/output system (BIOS) 514, containing the basic routines that help to transfer information between elements within computer 502, such as during start-up, is stored in ROM 512. RAM 510 typically contains data and/or program modules that are immediately accessible to and/or presently operated on by the processing unit 504.

Computer 502 can also include other removable/non-removable, volatile/non-volatile computer storage media. By way of example, FIG. 5 illustrates a hard disk drive 516 for reading from and writing to a non-removable, non-volatile magnetic media (not shown), a magnetic disk drive 518 for reading from and writing to a removable, non-volatile magnetic disk 520 (e.g., a "floppy disk"), and an optical disk drive 522 for reading from and/or writing to a removable, non-volatile optical disk 524 such as a CD-ROM, DVD-ROM, or other optical media. The hard disk drive 516, magnetic disk drive 518, and optical disk drive 522 are each connected to the system bus 508 by one or more data media interfaces 525.

Alternatively, the hard disk drive 516, magnetic disk drive 518, and optical disk drive 522 can be connected to the system bus 508 by a SCSI interface (not shown).

The disk drives and their associated computer-readable media provide non-volatile storage of computer readable instructions, data structures, program modules, and other data for computer 502. Although the example illustrates a hard disk 516, a removable magnetic disk 520, and a removable optical disk 524, it is to be appreciated that other types of computer readable media which can store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, can also be utilized to implement the exemplary computing system and environment.

Any number of program modules can be stored on the hard disk 516, magnetic disk 520, optical disk 524, ROM 512, and/or RAM 510, including by way of example, an operating system 526, one or more application programs 528, other program modules 530, and program data 532. Each of such operating system 526, one or more application programs 528, other program modules 530, and program data 532 (or some combination thereof) may include an embodiment of the RTC and/or MP disclosed herein. Operating system 526 can include the standard operating system streaming audio capture and render services described above (SAC and SAR). Using these services of operating system 526, a client application, such an RTC, a MP, etc., is able to get a global audio output system-wide mix for signal processing.

Computer system 502 can include a variety of computer readable media identified as communication media. Communication media typically embodies computer readable instructions, data structures, program modules, or other data in a modulated data signal such as a carrier wave or other transport mechanism and includes any information delivery media.

The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

A user can enter commands and information into computer system 502 via input devices such as a keyboard 534 and a pointing device 536 (e.g., a "mouse"). A microphone 535 can be used to input vocal command that can be subject to a voice recognition process for passing on the vocal input. Other input devices 538 (not shown) can include a joystick, game pad, satellite dish, serial port, scanner, and/or the like. These and other input devices are connected to the processing unit 504 via input/output interfaces 540 that are coupled to the system bus 508, but may be connected by other interface and bus structures, such as a parallel port, game port, or a universal serial bus (USB).

A monitor 542 or other type of display device can also be connected to the system bus 508 via an interface, such as a video adapter 544. Input/output interfaces 540 can include a sound card, an integrated (e.g., on-board) sound card, etc. One or more speakers 537 can be in communication with input/output interfaces 540. In addition to the monitor 542, other output peripheral devices can include components such as a printer 546 which can be connected to computer 502 via the input/output interfaces 540.

Computer 502 can operate in a networked environment using logical connections to one or more remote computers, such as a remote computing device 548. By way of example, the remote computing device 548 can be a personal computer, portable computer, a server, a router, a network computer, a peer device or other common network node, and the like. The remote computing device 548 is illustrated as a portable computer that can include many or all of the elements and features described herein relative to computer system 502.

Logical connections between computer 502 and the remote computer 548 are depicted as a local area network (LAN) 550 and a general wide area network (WAN) 552. Such networking environments are commonplace in offices, enterprise-wide computer networks, intranets, and the Internet. When implemented in a LAN networking environment, the computer 502 is connected to a local network 550 via a network interface or adapter 554. When implemented in a WAN networking environment, the computer 502 typically includes a modem 556 or other means for establishing communications over the wide network 552. The modem 556, which can be internal or external to computer 502, can be connected to the system bus 508 via the input/output interfaces 540 or other appropriate mechanisms. It is to be appreciated that the illustrated network connections are exemplary and that other means of establishing communication link(s) between the computers 502 and 548 can be employed.

In a networked environment, such as that illustrated with computing environment 500, program modules depicted relative to the computer 502, or portions thereof, may be stored in a remote memory storage device. By way of example, remote application programs 558 reside on a memory device of remote computer 548. For purposes of illustration, application programs and other executable program components, such as the operating system, are illustrated herein as discrete blocks, although it is recognized that such programs and components reside at various times in different storage components of the computer system 502, and are executed by the data processor(s) of the computer.

CONCLUSION

Using the disclosed implementations for slaving one or more hardware devices to a master hardware device, the software processing done on media data streams can be kept synchronized to a rate at which the hardware is consuming or producing the media data streams, thereby avoiding errors (e.g., glitches) or temporary disruptions in the media data streams.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

What is claimed is:

1. A method comprising:
   outputting a data stream processed with an engine component beginning at an initial time S1 at a reference clock until a predetermined quantity thereof is processed;
   rendering the output data stream with a hardware device synchronized with a hardware clock; and setting a new time S1 as the initial time S1 plus a predetermined time period plus any difference between the time of the reference clock and the time of the hardware clock.

2. The method as defined in claim 1, further comprising:
repeating the outputting at the new time S1 at the reference clock;
repeating the rendering; and
setting a next time S1 to be equal to the new time S1 plus the predetermined time period plus any time difference between the reference and hardware clocks.

3. The method as defined in claim 1, wherein the outputting further comprises:
determining a rendered quantity of the output data stream that was rendered by the engine component after the initial time S1; and
adjusting, using the rendered quantity, the predetermined quantity of the data stream that is to be output by the engine component.

4. The method as defined in claim 1, wherein:
the engine component is a software component of an operating system of a computing system; and
the reference clock is a clock for synchronizing the operation of the operating system.

5. The method as defined in claim 1, wherein:
the engine component is an audio engine;
the audio engine is a software component of an audio systems service of an operating system of a computing system; and
the hardware device is a sound card driven by a sound driver in communication with the audio systems service of the operating system of the computing system.

6. The method as defined in claim 1, wherein:
the new time S1 occurs on the reference clock after the passage of the predetermined time period when the time at the hardware clock matches the time at the reference clock;
the new time S1 occurs on the reference clock less than the initial S1 time plus the wake up period when the hardware clock is faster than the reference clock; and
the new time S1 occurs on the reference clock more than the initial S1 time plus the wake up period when the hardware clock is slower than the reference clock.

7. The method as defined in claim 1, wherein the setting a new time S1 further comprises adjusting the new time S1 so that, after the new time S1 and during the predetermined wake up period, the amount the data steam processed by the engine component matches the amount rendered by the hardware device.

8. The method as defined in claim 1, wherein, after the next wake up time and during the predetermined wake up period, the engine component generates a data stream that is consumed by the hardware device.

9. The method as defined in claim 1, wherein the processing of the data stream by the hardware device comprises a process selected from the group consisting of rendering and capturing.

10. The method as defined in claim 1, wherein the outputting a data stream processed with an engine component is performed by an operating system.

11. A computing system comprising an operating system performing the method of claim 1 for a plurality of said hardware devices that are in communication with the operating system through respective drivers, wherein:
each said hardware device has at least one said hardware clock;

the engine component is a software component of the operating system; and
the reference clock is the system time of the operating system.

12. One or more computer-readable media having computer-readable instructions thereon which, when executed by one or more processors, cause the one or more processors to implement the method of claim 1.

13. One or more computer-readable storage comprising computer executable instructions that, when executed, direct a computing system to:
wake up a pump component at an initial wake up time at a reference clock;
call an engine component at the initial wake up time to being processing a predetermined quantity of a data stream;
terminate the processing of the data stream by the engine component after the predetermined quantity of the data stream has been processed by the engine component;
call a hardware device to process the data stream that has been processed by the engine component, wherein the processing by the hardware device is synchronized with a hardware clock of the hardware device;
find a time difference between the reference clock and the hardware clock of the hardware device; and
set the next wake up time for the pump component according to a predetermined wake up period and the found time difference.

14. The one or more computer-readable storage as defined in claim 13, wherein the computer executable instructions further comprise:
waking up the pump component at the next wake up time at the reference clock;
calling the engine component at the next wake up time to being processing the predetermined quantity of the data stream;
terminating the processing of the data stream by the engine component after the predetermined quantity of the data stream has been processed by the engine component;
calling the hardware device to process the data stream that has been processed by the engine component;
determining a time difference between the reference clock and the hardware clock of the hardware device; and
setting the next wake up time for the pump component according to the predetermined wake up period and the determined time difference.

15. The One or more computer-readable storage as defined in claim 13, wherein the wake up of a pump component at a wake up time at a reference clock further comprises:
determining a quantity of the data stream that has been processed by the hardware device since the initial wake up time; and
setting, using the determined quantity of the data stream, the predetermined quantity of the data stream that is to be processed by the engine component after the next wake up time.

16. The One or more computer-readable storage as defined in claim 13, wherein:
the pump component and the engine component are software components of an operating system of the computing system; and
the reference clock is a clock for synchronizing the operation of the operating system.

17. The One or more computer-readable storage as defined in claim 13, wherein:
the pump component is an audio pump;
the engine component is an audio engine;

the audio pump and the audio engine are software components of an audio systems service of an operating system of the computing system; and the hardware device is a sound card driven by a sound driver in communication with the audio systems service of the operating system of the computing system.

18. The One or more computer-readable storage as defined in claim 13, wherein:

the next wake up time occurs after the passage of the predetermined wake period from the initial wake up time when the time at the hardware clock of the hardware device matches the time at the reference clock;

the next wake up time is less than the predetermined wake period when the hardware clock of the hardware device is faster than the reference clock; and the next wake up time is later than the predetermined wake period when the hardware clock of the hardware device is slower than the reference clock.

19. The One or more computer-readable storage as defined in claim 13, wherein the set the next wake up time for the pump component according to a predetermined wake up period and the found time difference further comprises adjusting the next wake up time so that, after the next wake up time and during the predetermined wake up period, the amount the data stream processed by the engine component matches amount the data stream processed by the hardware device.

20. The One or more computer-readable storage as defined in claim 13, wherein, after the next wake up time and during the predetermined wake up period, the engine component generates a data stream that is consumed by the hardware device.

21. The One or more computer-readable storage as defined in claim 13, wherein the processing of the data stream by the hardware device comprises a process selected from the group consisting of rendering and capturing.

22. A computing system comprising an operating system performing the computer executable instructions of claim 13 with a plurality of said hardware devices that are in communication with the operating system through respective drivers, wherein:

each said hardware device has at least one said hardware clock;

the pump component and the engine component are software components of the operating system; and the reference clock is the system time of the operating system.

23. A method comprising:
determining the time at:
a reference clock;
a master hardware clock for synchronizing the processing of a data stream by a master hardware device; and
one or more slave hardware clocks for synchronizing the processing of respective data streams by respective slave hardware devices;

processing a respective said data stream with the master hardware device and with each of the one or more slave hardware devices;

determining, using the time determined at the reference clock and at the master hardware clock, a master rate at which the data stream is processed by the master hardware device;

determining, using the time determined at the master hardware clock and at each of the one or more said slave hardware clocks, a respective slave rate at which the respective said data stream is processed by a respective said slave hardware device;

consuming a data stream at the master rate with one or more Variable Rate Sample Rate Converters (SRC) respectively corresponding to the one or more slave hardware devices; and generating a data stream with the one or more SRCs at the slave rate of the corresponding one or more slave hardware devices.

24. The method as defined in claim 23, wherein each of the one or more slave hardware devices consumes a respective data stream that is generated by the corresponding one or more SRC.

25. The method as defined in claim 23, wherein:

the reference clock is the system clock for an operating system of a computing system that is executing an audio playback application processing a multichannel sound track;

the master hardware device and each of the one or more slave hardware devices are selected from the group consisting of a sound card, a stereo sound card, a network audio device, and a Universal Serial Bus (USB) audio device;

each of the master hardware device and each said slave hardware device:
is driven by a respective driver in communication with the operating system; and
generates one of more channels of sound for output to respective audio devices that are selected from the group consisting of a TCP/IP speaker for receiving a channel of sound, a USB speaker set for receiving a two channels of sound from a USB port card, and a speaker for receiving a channel of sound from a stereo sound card;

each channel of the multichannel sound track is rendered by the speakers in communication, respectively, with the master hardware device and the one or more slave hardware devices.

26. The method as defined in claim 23, wherein:

the reference clock is the system clock for an operating system of a computing system that is executing a multimedia playback application processing a multichannel media track;

the master hardware device is a video card driven by a driver in communication with the operating system for outputting video data to a display monitor;

the one or more slave hardware devices is a stereo sound card driven by a driver in communication with the operating system;

the stereo sound card generates two (2) channels of sound for output to a respective pair of speakers for receiving the two channels of sound from the stereo sound card; and two channels of the multichannel media track are rendered by the speakers in communication with the sound card.

27. One or more computer-readable storage having computer-readable instructions thereon which, when executed by one or more processors, cause the one or more processors to implement the method of claim 23.

28. One or more computer-readable storage comprising computer executable instructions that, when executed, direct a computing system to:

determine the time at:
a reference clock;
a master hardware clock for synchronizing the processing of a data stream by a master hardware device; and
a first slave hardware clock for synchronizing the processing of a data stream by a first slave hardware device;

processing a data stream with the master hardware device;
determine, from the time determined at the reference clock and the master hardware clock, a master rate at which the data stream is processed by the master hardware device;
process a data stream with the first slave hardware device;
determine, from the time determined at the master hardware clock and the first slave hardware clock, a first slave rate at which the data stream is processed by the first slave hardware device;
consume a data stream at the master rate with a first slave SRC; and
generate a data stream with the first slave SRC at the first slave rate for input to the first slave hardware device.

29. The One or more computer-readable storage as defined in claim 28, wherein the computer executable instructions, when executed, further direct the computing system to consume with the first slave hardware device the data stream that is generated by the first slave SRC.

30. The One or more computer-readable storage as defined in claim 28, wherein the computer executable instructions, when executed, further direct the computing system to:
determine the time at a second slave hardware clock for synchronizing the processing of a data stream by a second slave hardware device;
process a data stream with the second slave hardware device;
determine, from the time determined at the master hardware clock and the second slave hardware clock, a second slave rate at which the data stream is processed by the second slave hardware device;
consume a data stream at the master rate with a second slave SRC; and
generate a data stream with the second slave SRC at the second slave rate.

31. The One or more computer-readable storage as defined in claim 30, wherein the computer executable instructions, when executed, further direct the computing system to consume with the second slave hardware device the data stream that is generated by the second slave SRC.

32. The One or more computer-readable storage as defined in claim 31, wherein:
the reference clock is the system clock for an operating system of the computing system;
the computing system is executing an audio playback application processing a six channel sound track;
the master hardware device and the first and second hardware devices are selected from the group consisting of:
one stereo sound card and two Universal Serial Bus speaker sets;
two stereo sound cards and one USB speaker set;
a plurality of TCP/IP speakers;
a plurality of USB speaker sets; and
three stereo sound cards;
each of the master hardware device and the first and second hardware devices:
are driven by respective drivers in communication with the operating system; and
generates two (2) channels of sound for output to a respective pair of speakers;
the six channels of the six channel sound track are respectively rendered by the six speakers in communication, respectively, with the master hardware device and the first and second hardware devices.

33. An apparatus comprising:
a master hardware device synchronized with a master hardware clock for the processing of a data stream;
one or more slave hardware devices each synchronized with a corresponding slave hardware clock for the processing of a respective data stream;
a plurality of drivers for respectively driving each of the master hardware device and the one or more slave hardware devices;
one or more or processors executing an operating system that:
is in communication with each said driver;
is synchronized with a reference clock;
is executing a media playback application processing a multichannel media track;
includes one or more SRCs respectively corresponding to the one or more slave hardware devices;
includes system services for:
determining the time at:
the reference clock;
the master hardware clock; and
the one or more slave hardware clocks;
processing the respective data stream with the master hardware device and with each of the one or more slave hardware devices;
determining, using the time determined at the reference clock and at the master hardware clock, a master rate at which the data stream is processed by the master hardware device;
determining, using the time determined at the master hardware clock and at each of the one or more said slave hardware clocks, a respective slave rate at which the respective said data stream is processed by a respective said slave hardware device;
consuming a data stream at the master rate with the one or more SRCs respectively corresponding to the one or more slave hardware devices; and
generating a data stream with the one or more SRCs at the slave rate of the corresponding one or more slave hardware devices.

34. The apparatus as defined in claim 33, wherein each of the one or more slave hardware devices consumes a respective data stream that is generated by the corresponding one or more SRC.

35. The apparatus as defined in claim 33, wherein:
the reference clock is the system clock for the operating system;
the master hardware device and each said slave hardware device are selected from the group consisting of a stereo sound card, and a Universal Serial Bus (USB) audio device;
the master hardware device and each of the slave hardware devices generates two (2) channels of sound for output to a respective pair of speakers that are each selected from the group consisting of a TCP/IP speaker for receiving a channel of sound, a USB speaker set for receiving a two channels of sound from a USB port card, and a speaker for receiving a channel of sound from a stereo sound card; and
each channel of the multichannel media track is rendered by one said speaker in communication, respectively, with the master hardware device and the one or more slave hardware devices.

36. The apparatus as defined in claim 33, wherein:
the reference clock is the system clock for the operating system;
the master hardware device is a video card;
the one or more slave hardware devices is a sound card selected from the group consisting of a stereo sound card and a Universal Serial Bus (USB) audio device;

the video card generates video data for output to a display monitor;

the sound card generates two (2) channels of sound for output to a respective pair of speakers; and each channel of the multichannel media track is rendered by one said speaker in communication the sound card.

37. A method comprising:
determining the time at:
   a reference clock;
   a master hardware clock for synchronizing the processing of a video data stream by a video card; and
   a slave hardware clock for synchronizing the processing of an audio data stream by a sound card;
processing the video data stream with the video card;
processing the audio data stream with the sound card;
determining, using the time determined at the reference clock and at the master hardware clock, a master rate at which the data stream is processed by the video card;
determining, using the time determined at the master hardware clock and at the slave hardware clock, a respective slave rate at which the audio data stream is processed by the sound card;
consuming an audio data stream at the master rate with an SRC for the sound card; and
generating an audio data stream with the SRC at the slave rate of the sound card.

38. The method as defined in claim 37, wherein the sound card consumes the audio data stream that is generated by the SRC.

39. The method as defined in claim 37, wherein:
the consuming an audio data stream at the master rate with an SRC for the sound card further comprises rendering an audio data stream from a Streaming Audio Renderer (SAR) that is slaved to the video card; and
the SAR renders the audio data stream to SRC;
the SRC uses a clock manager to match the respective slave rate at which the audio data stream is processed by the sound card to the processing of the video data stream with the video card so as to remain synchronized with the video data stream processed by the video card.

40. The method as defined in claim 39, wherein the SAR is slaved to the video card by synchronizing the rendering by the SAR with the reference clock.

41. The method as defined in claim 37, wherein:
the reference clock is the system clock for an operating system of a computing system that is executing a multimedia playback application processing a multimedia data stream;

the video card and the sound card are each driven by a respective driver in communication with the operating system; and the sound card generates multiple channels of sound for output of each said channel to a respective speaker for rendering.

42. One or more computer-readable media having computer-readable instructions thereon which, when executed by one or more processors, cause the one or more processors to implement the method of claim 37.

43. An apparatus comprising:
a video card synchronized with a master hardware clock for the processing of a video data stream;
a sound card synchronized with a slave hardware clock for the processing of an audio data stream; and
one or more or processors executing an operating system that:
   is in communication with a video driver for driving the video card and an audio driver for driving the sound card;
   is executing a multimedia playback application processing a multimedia data stream source;
   includes an SRC corresponding to the sound card;
   includes system services for:
      determining the time at:
         the reference clock;
         the master hardware clock; and
         the slave hardware clock;
      processing the video data stream with the video card;
      processing the audio data stream with the sound card;
      determining, using the time determined at the reference clock and at the master hardware clock, a master rate at which the video data stream is processed by the video card;
      determining, using the time determined at the master hardware clock and at the slave hardware clock, a slave rate at which the audio data stream is processed by the sound card;
      consuming an audio data stream at the master rate with the SRC corresponding to the sound card; and
      generating an audio data stream with the SRC at the slave rate of the sound card.

44. The apparatus as defined in claim 43, wherein the sound card consumes an audio data stream that is generated by the SRC.

\* \* \* \* \*